(12) United States Patent
Oertley

(10) Patent No.: US 6,305,763 B1
(45) Date of Patent: Oct. 23, 2001

(54) APPARATUS AND METHOD FOR OPERATING A HYDRAULIC EXCAVATOR WHICH HAS A POSITION SENSOR FOR SENSING POSITION OF AN IDLER WHEEL

(75) Inventor: Thomas E. Oertley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/464,965

(22) Filed: Dec. 16, 1999

(51) Int. Cl.$^7$ ................................................ B62D 55/14
(52) U.S. Cl. .................................... 305/145; 305/144
(58) Field of Search ................................ 305/143, 144, 305/145, 148, 149; 180/9.1

(56) References Cited

U.S. PATENT DOCUMENTS

| | | | |
|---|---|---|---|
| 2,697,641 | * 12/1954 | Henderson | 305/145 |
| 3,310,127 | 3/1967 | Siber et al. . | |
| 3,360,063 | 12/1967 | Hausenblas et al. . | |
| 3,645,586 | 2/1972 | Piepho . | |
| 3,901,563 | 8/1975 | Day . | |
| 3,910,649 | 10/1975 | Röskaft . | |
| 3,972,569 | 8/1976 | Bricknell . | |
| 4,457,564 | 7/1984 | Ruge et al. . | |
| 4,458,954 | 7/1984 | Haas . | |
| 4,681,376 | * 7/1987 | Riml | 305/146 |
| 4,826,470 | 5/1989 | Breon et al. . | |
| 4,840,437 | 6/1989 | Henry et al. . | |
| 4,854,650 | * 8/1989 | Getz et al. | 305/148 |
| 4,887,872 | 12/1989 | Adams et al. . | |
| 5,165,765 | 11/1992 | Baylor . | |
| 5,316,381 | 5/1994 | Issacson et al. . | |
| 5,482,126 | 1/1996 | Bouit et al. . | |
| 5,906,150 | * 5/1999 | Sakai et al. | 305/145 |
| 6,024,183 | * 2/2000 | Dietz et al. | 180/9.1 |
| 6,027,185 | * 2/2000 | Crabb | 305/148 |
| 6,106,082 | * 8/2000 | Gustin | 301/145 |
| 6,224,172 | * 5/2001 | Goodwin | 301/145 |

* cited by examiner

Primary Examiner—S. Joseph Morano
Assistant Examiner—Long Bao Nguyen
(74) Attorney, Agent, or Firm—Maginot, Addison & Moore

(57) ABSTRACT

A method of operating a work machine having (i) a drive motor for driving a drive track chain, (ii) a track tensioning assembly for adjusting tension on the drive track chain, and (iii) a work implement for performing a work function includes the step of idling the drive motor so as to cease advancement of the work machine during a first period of time. The method further includes the step of operating the work implement so as to perform the work function during the first period of time. The method also includes the step of operating the track tensioning assembly so as to increase tension on the drive track chain during the first period of time. The method yet further includes the step of actuating the drive motor so as to advance the work machine during a second period of time. Moreover, the method includes the step of operating the track tensioning assembly so as to decrease tension on the drive track chain during the second period of time. A work machine is also disclosed.

16 Claims, 15 Drawing Sheets

APPARATUS AND METHOD FOR OPERATING A HYDRAULIC EXCAVATOR WHICH HAS A POSITION SENSOR FOR SENSING POSITION OF AN IDLER WHEEL

CROSS REFERENCE

Cross reference is made to copending U.S. patent applications Ser. No. 09/464,964, entitled "Apparatus and Method for Adjusting Tension of a Drive Track Chain of a Work Machine Which Utilizes a Sensor for Sensing Position of an Undercarriage Component" by Thomas E. Oertley; Ser. No. 09/464,963, entitled "Valve Assembly For Controlling Actuation of an Actuator of a Track Tensioning System" by Thomas E. Oertley; Ser. No. 09/465,467, entitled "Apparatus and Method for Operating a Track Tensioning Assembly of a Hydraulic Excavator" by Thomas E. Oertley; Ser. No. 09/464,966, entitled "Track Tensioning Assembly for Adjusting Tension on a Drive Track Chain of a Work Machine Having an Actuator Which Includes a Pair of Concentrically Arranged Pistons" by Thomas E. Oertley; and Ser. No. 09/464,967, entitled "Track Tensioning Assembly for Adjusting Tension on a Drive Track Chain of a Work Machine Having a Slack Adjuster Device Associated Therewith" by Clifford E. Miller, each of which is assigned to the same assignee as the present invention, and each of which is filed concurrently herewith.

TECHNICAL FIELD OF THE INVENTION

The present invention relates generally to a drive track chain of a work machine, and more particularly to an apparatus and method for operating a hydraulic excavator which has a position sensor for sensing position of an idler wheel.

BACKGROUND OF THE INVENTION

A work machine, such as a track-type tractor or excavator, is typically supported and propelled by a pair of undercarriage assemblies, each one of which includes an endless drive track chain having a plurality of interconnected articulating components or links. The undercarriage assembly typically also includes a drive sprocket and one or more idler wheels, around each of which the drive track chain is advanced.

During operation of the work machine, it is necessary to maintain tension on the drive track chain in order to keep the chain from derailing from the drive sprocket and/or the idler rollers. In order to maintain tension on the drive track chain, a tension adjustment mechanism such as a hydraulic cylinder or coiled spring is often included in heretofore designed undercarriages. In particular, the cylinder or coiled spring urges the front idler roller in a direction away from the rear idler roller (or rear drive sprocket in the case of an excavator) thereby creating tension on the track chain.

Over a period of time, a number of the components associated with the undercarriage assembly, such as the links and bushings of the drive track chain and even the idler rollers themselves, begin to wear thereby creating slack in the drive track chain. In order to remove the slack from the drive track chain, it is necessary to increase the tension of the track chain. Such an increase in the tension is generally accomplished by manually injecting or otherwise inserting a material, such as grease, into the tension adjustment mechanism associated with the undercarriage assembly.

The use of such tension adjustment mechanisms has a number of drawbacks associated therewith. For example, manual injection of grease into the slack adjustment mechanism is a labor intensive task which can often lead to a decrease in the efficiency associated with operation of the work machine. Moreover, the drive track chain may inadvertently be operated for a period of time with excessive slack therein. This is true since the drive track chain may be operated with excessive slack from the point in time in which slack is first introduced into the track chain until the point in time in which the tension is manually increased. Such excessive slack may cause irregular wear of a number of the components associated with the undercarriage assembly. Moreover, such excessive slack may also cause the drive track chain to derail during movement of the work machine thereby reducing the efficiency of the work machine due to the delays caused by repair of the undercarriage assembly.

In order to avoid the problems associated with excessive slack in the drive track chain, heretofore designed undercarriage assemblies have been operated with relatively large amounts of tension on the drive track chain. However, operation of the undercarriage assembly with a relatively taut track chain during advancement of the work machine increases the rate at which components associated with the undercarriage assembly wear thereby potentially reducing the useful life of the undercarriage assembly.

Moreover, with particular regard to excavators, it is generally desirable to have the drive track chain relatively taut during performance of a digging or other type of work function in order to prevent the excavator from rolling back and forth within the interior of the drive track chain as a result of recoil forces generated during performance of the digging operation. Hence, a relatively high tension level is typically maintained on the drive track chains of excavators at all times even though it is known that use of such a high tension level increases the rate at which components associated with the undercarriage assembly wear during advancement of the excavator.

What is needed therefore is a track tensioning assembly which overcomes one or more of the above-mentioned drawbacks.

DISCLOSURE OF THE INVENTION

In accordance with a first embodiment of the present invention, there is provided a method of operating a work machine having (i) a drive motor for driving a drive track chain, (ii) a track tensioning assembly for adjusting tension on the drive track chain, and (iii) a work implement for performing a work function. The method includes the step of idling the drive motor so as to cease advancement of the work machine during a first period of time. The method further includes the step of operating the work implement so as to perform the work function during the first period of time. The method also includes the step of operating the track tensioning assembly so as to increase tension on the drive track chain during the first period of time. The method yet further includes the step of actuating the drive motor so as to advance the work machine during a second period of time. Moreover, the method includes the step of operating the track tensioning assembly so as to decrease tension on the drive track chain during the second period of time.

In accordance with a second embodiment of the present invention, there is provided a work machine. The work machine includes a drive track chain and an idler wheel for providing tension to the drive track chain. The work machine also includes an actuator mechanically coupled to the idler wheel so as to selectively move the idler wheel between a number of wheel positions. The work machine further includes a first sensor for sensing position of the idler wheel. The work machine yet further includes a second sensor for determining if the work machine is being operated in a drive mode of operation or a work mode of operation. Yet further, the work machine includes a processing unit electrically coupled to both the first sensor and the second sensor. The work machine also includes a memory device electrically coupled to the processing unit. The memory device has stored therein a plurality of instructions which, when executed by the processing unit, causes the processing unit to (i) monitor output from the second sensor so as to determine if the work machine is being operated in the work mode of operation, (ii) generate an increase-tension control signal if the work machine is being operated in the work mode of operation, (iii) actuate the actuator in response to generation of the increase-tension control signal so as to advance the idler wheel in a first direction which causes tension on the drive track chain to be increased, and (iv) monitor output from the first sensor so as to determine position of the idler wheel during advancement of the idler wheel in the first direction.

In accordance with a third embodiment of the present invention, there is provided a hydraulic excavator. The excavator includes a hydraulic implement assembly having a boom assembly with a bucket secured thereto. The excavator also includes a drive track chain and a track tensioning assembly for tensioning the drive track chain. The excavator further includes a sensor configured to detect operation of the implement assembly by an operator of the excavator. Yet further, the excavator includes a controller electrically coupled to the sensor. The controller is configured to operate the track tensioning assembly so as to increase tension of the drive track chain when the sensor detects operation of the implement assembly by the operator of the work machine.

BEST MODE FOR CARRYING OUT THE INVENTION

Figure 1:
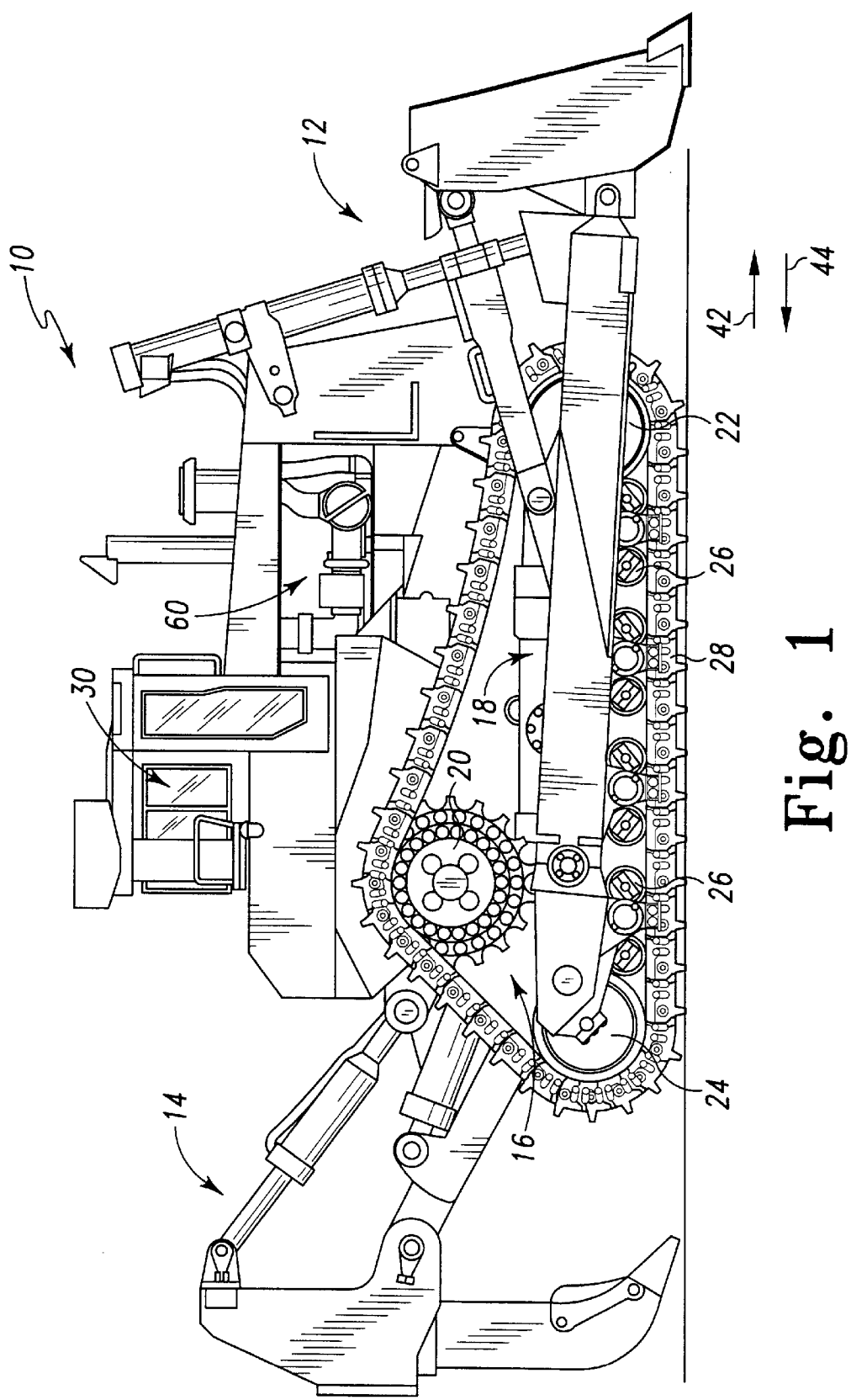
FIG. 1 is a side elevational view of a track-type tractor which incorporates the features of the present invention therein.
Figure 2:
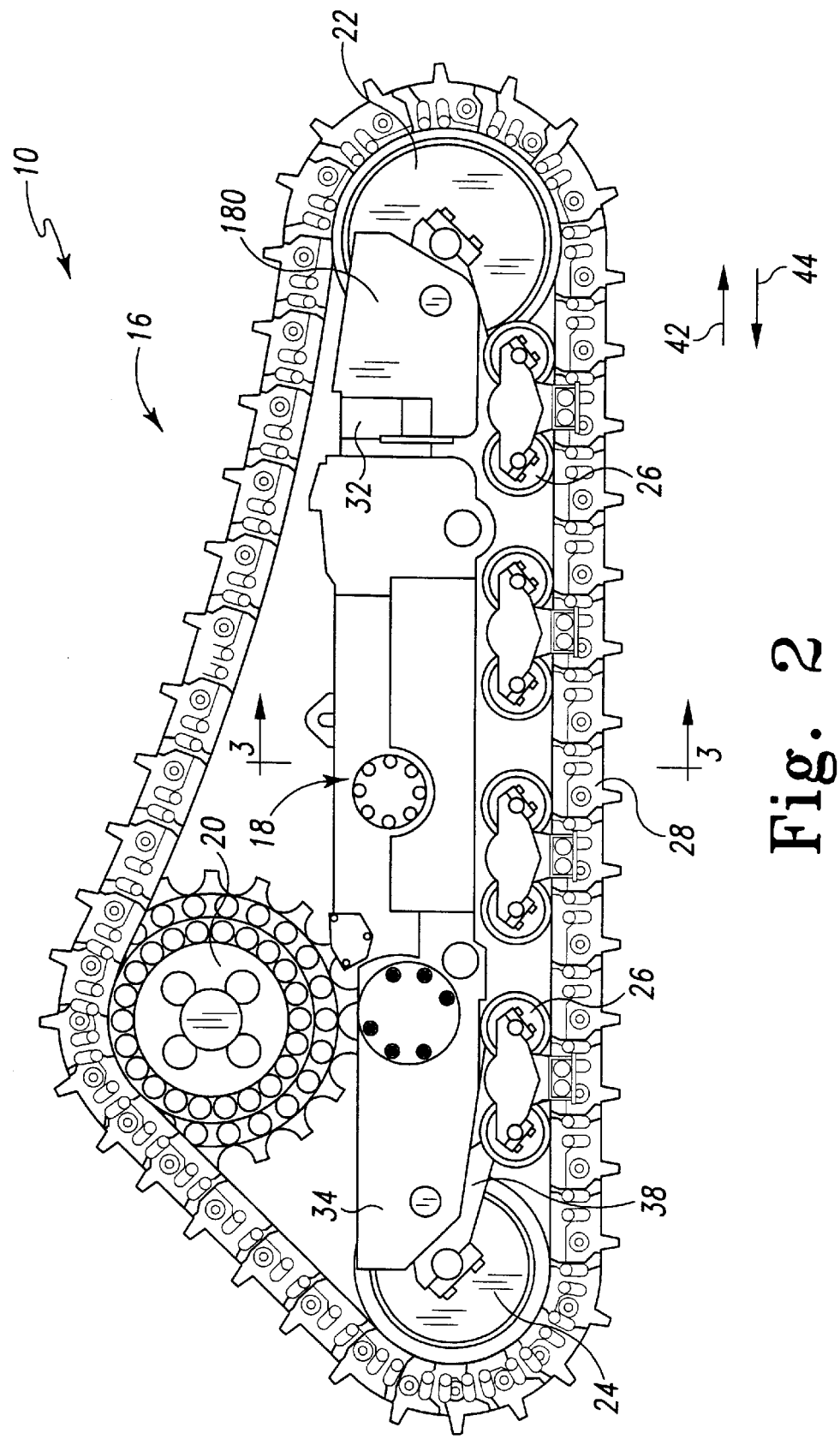
FIG. 2 is an enlarged side elevational view of the undercarriage assembly of the tractor of FIG. 1.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown a work machine such as a track-type tractor 10 which is utilized to perform numerous work functions such as earth moving and ripping. The track-type tractor 10 includes a number of work implements such as a hydraulically-powered blade assembly 12 and a hydraulically-powered ripper 14. The track-type tractor 10 further includes an engine such as a diesel engine 60 for providing the motive power for both advancing the tractor and operating the blade assembly 12 and the ripper 14.

The track-type tractor 10 also includes an undercarriage assembly 16. The undercarriage assembly 16 includes a frame assembly 18, a drive sprocket 20, a front idler wheel 22, a rear idler wheel 24, and a number of midroller assemblies 26. An endless drive track chain 28 is driven by the drive sprocket 20 so as to be advanced around each of the front idler wheel 22, the rear idler roller 24, and the midroller assemblies 26 thereby providing the motive power for the work machine. In particular, mechanical output from the engine 60 is transmitted to the drive sprocket 20 via a transmission assembly (not shown) thereby driving the drive sprocket 20 so as to advance the drive track chain 28 and hence the track-type tractor 10. It should be appreciated that although only one side of the track-type tractor 10 is shown in FIG. 1, the other side of the tractor 10 would also include an undercarriage assembly 16 having similar components as those shown in FIG. 1 (e.g. a frame assembly 18, drive sprocket 20, idler wheels 22, 24, midroller assemblies 26, and drive track chain 28).

The track-type tractor 10 also includes a cab 30. The cab 30 is provided to enclose or otherwise house the devices associated with the track-type tractor 10 which are utilized by an operator during operation of the track-type tractor 10. In particular, the cab 30 houses an operator seat (not shown) and a control assembly which includes, for example, a steering wheel and foot pedal assembly (not shown).

Figure 3:
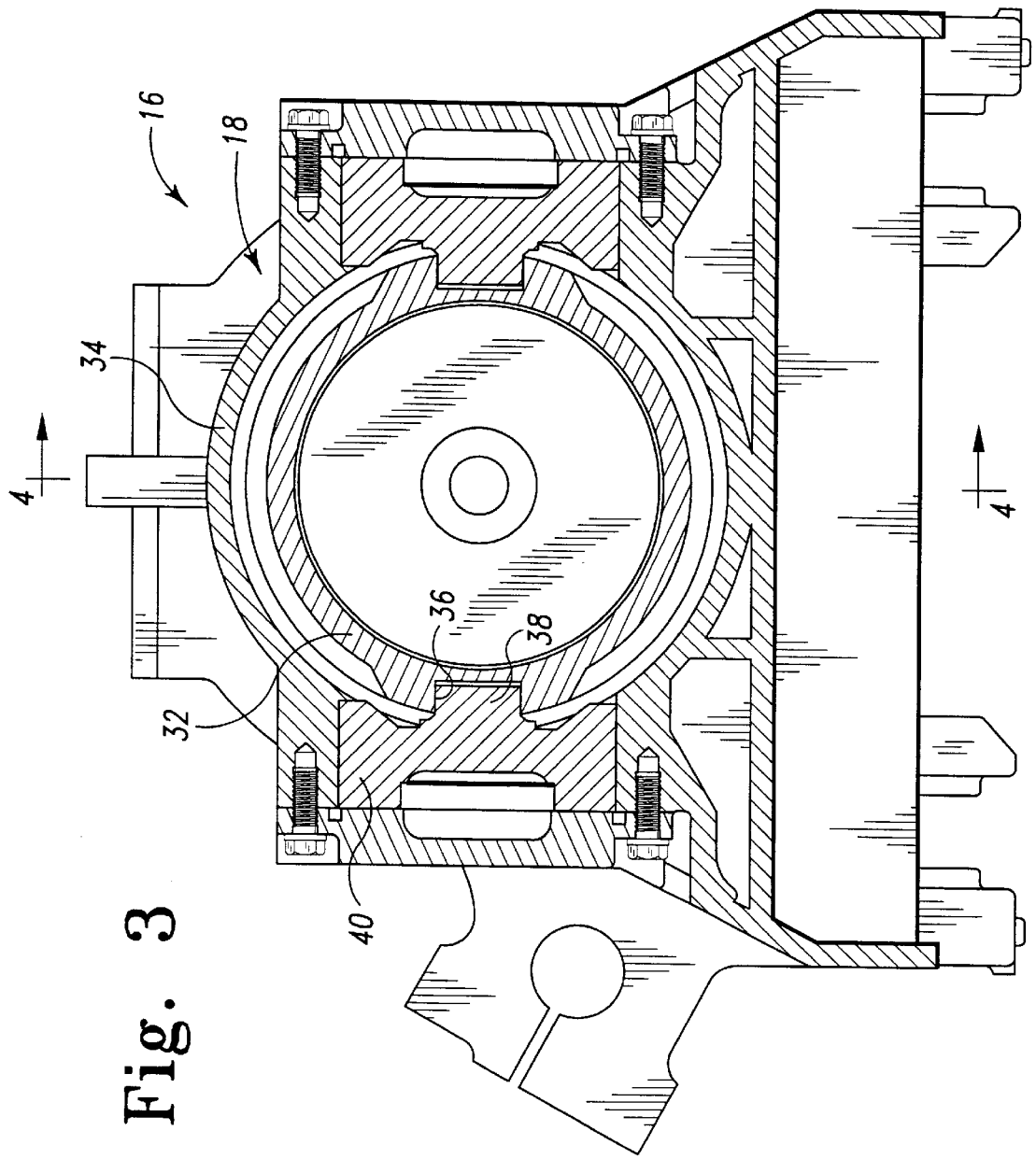
FIG. 3 is cross sectional view of the frame assembly of the undercarriage assembly taken along the line 3—3 of FIG. 2, as viewed in the direction of the arrows.
Figure 4:
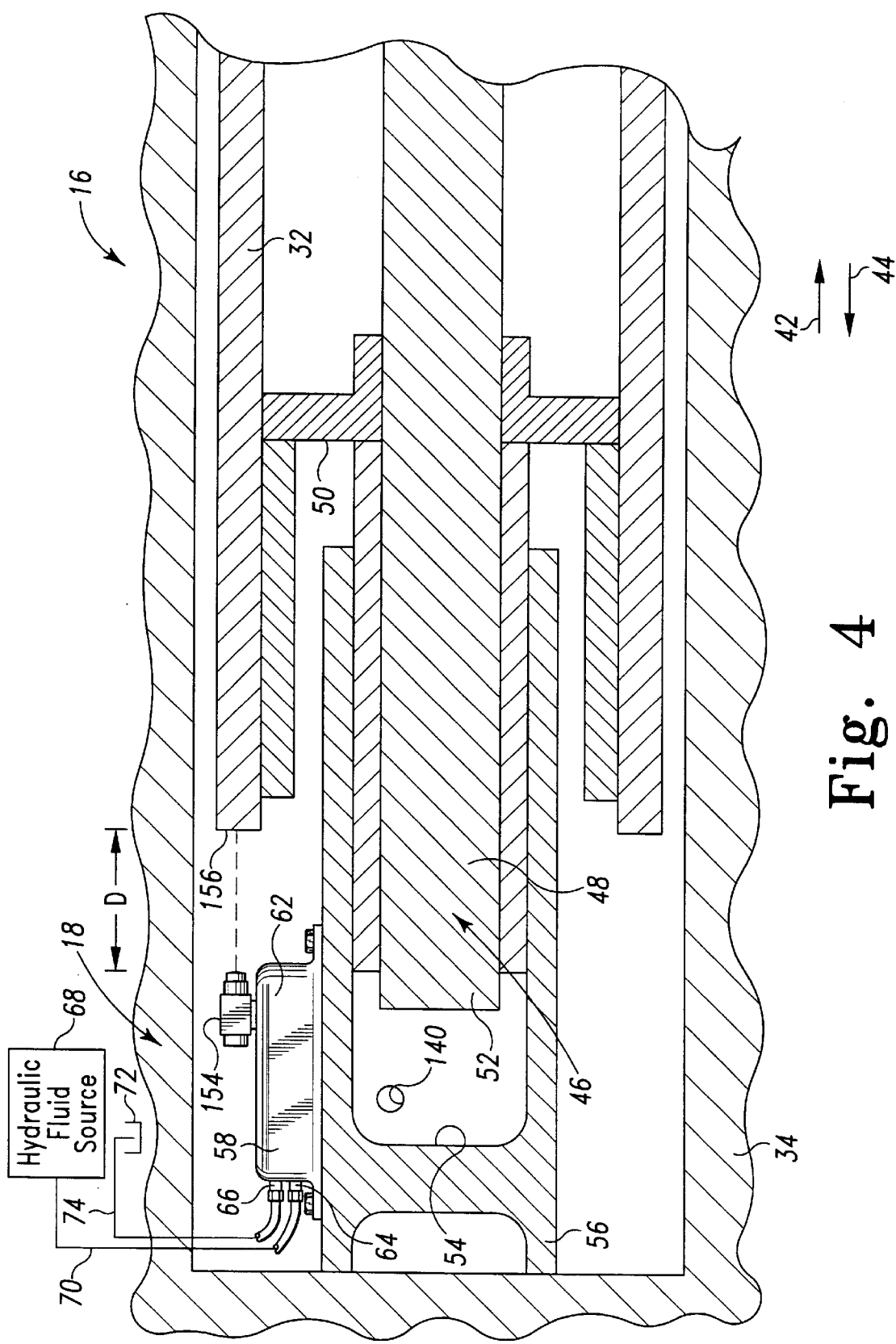
FIG. 4 is an enlarged fragmentary cross sectional view taken along the line 4—4 of FIG. 3, as viewed in the direction of the arrows (note that a number of the components shown in FIG. 4 are not shown in cross section for clarity of description)

As shown in more detail in FIGS. 2–5, the frame assembly 18 of the undercarriage assembly 16 includes a front frame member 32 and a rear frame member 34. The front frame member 32 is movable relative to the rear frame member 34. In particular, as shown in FIGS. 3 and 4, the front frame member 32 is slidably secured to the rear frame member 34. More specifically, the front frame member 32 has a receiving slot 36 defined therein. The receiving slot 36 receives an elongated extension tab 38 that is defined in an intermediate frame member 40. As shown in FIG. 3, the intermediate frame member 40 is non-movably secured to the rear frame member 34. The extension tab 38 is free to slide within the receiving slot 36 thereby allowing the front frame member 32 to slide relative to the intermediate frame member 40 and hence the rear frame member 34.

Movement of the front frame member 32 relative to the rear frame member 34 causes corresponding movement of the idler wheels 22, 24 relative to one another. In particular, the front idler wheel 22 is rotatably secured to the front frame member 32 via a yoke 180, whereas the rear idler wheel 24 is rotatably coupled to the rear frame member 34 via a support arm 38. Hence, when the front frame member 32 is moved relative to the rear frame member 34 in a forward direction (i.e. in the general direction of arrow 42 of FIG. 2), the front idler wheel 22 is likewise moved relative to the rear frame member 34 and hence the rear idler wheel 24 in the forward direction. Conversely, when the front frame member 32 is moved relative to the rear frame member 34 in a rearward direction (i.e. in the general direction of arrow 44 of FIG. 2), the front idler wheel 22 is likewise moved relative to the rear frame member 34 and hence the rear idler wheel 24 in the rearward direction.

As shown in FIG. 4, the frame assembly 18 further includes an actuator 46 such as a hydraulically-powered piston assembly for moving the front frame member 32 relative to the rear frame member 34. In particular, the actuator 46 includes a piston 48 which is mechanically secured to the front frame member 32 via a coupling member 50. An end portion 52 of the piston 48 is received into a fluid chamber 54 defined in a cylinder housing 56. The cylinder housing 56 is in turn secured to the rear frame member 34. Changes in fluid pressure within the fluid chamber 54 causes movement of the piston 48 and hence the front frame member 32 relative to the rear frame member 34. In particular, an increase in fluid pressure within the fluid chamber 54 causes the piston 48 and hence the front frame member 32 to be moved in the forward direction (i.e. in the general direction of arrow 42 of FIGS. 2 and 4), thereby causing the front idler wheel 22 to be likewise moved relative to the rear frame member 34 (and hence the rear idler wheel 24) in the forward direction. Conversely, a decrease in fluid pressure within the fluid chamber 54 causes the piston 48 and hence the front frame member 32 to be moved in the rearward direction (i.e. in the general direction of arrow 44 of FIGS. 2 and 4), thereby causing the front idler wheel 22 to be likewise moved relative to the rear frame member 34 (and hence the rear idler wheel 24) in the rearward direction.

Figure 5:
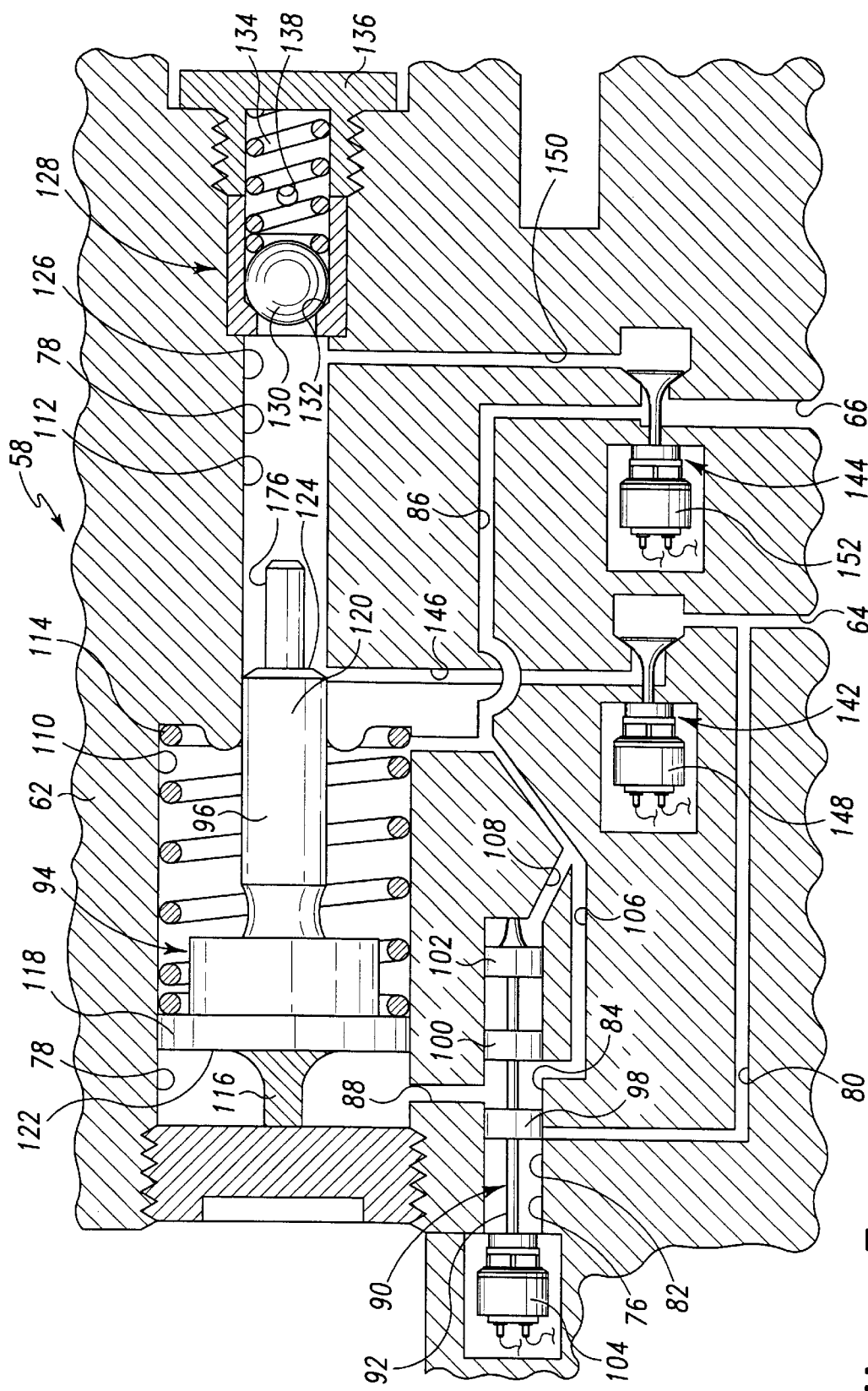
FIG. 5 is an enlarged fragmentary cross sectional view of the valve group assembly of the undercarriage assembly of FIG. 4.

Fluid pressure within the fluid chamber 54 is controlled by a valve group 58. As shown in FIGS. 4 and 5, the valve group 58 includes a housing 62 which has a fluid inlet 64 and a fluid outlet 66 defined therein. The fluid inlet 64 is fluidly coupled to a pressurized hydraulic fluid source 68 via a fluid line 70, whereas the fluid outlet 66 is fluidly coupled to a hydraulic reservoir 72 via fluid line 74. The pressurized hydraulic fluid source 68 may be any of the fluid circuits associated with the track-type tractor 10. As shall be discussed below in greater detail, the design of the valve group 58 enables use of a relatively low pressure fluid source as the pressurized hydraulic fluid source 68. For example, fluid pressure from the hydraulic transmission (not shown) of the track-type tractor 10 preferably functions as the pressurized hydraulic fluid source 68 thereby providing for a flow of pressurized hydraulic fluid at relatively low pressure (e.g. 400 psi). It should be appreciated that use of a relatively low pressure source such as the hydraulic transmission eliminates the need to utilize hydraulic fluid pressure from high-pressure, highly-utilized hydraulic systems such as the fluid circuits which power the work implements of the tractor 10 such as the blade assembly 12 and the ripper 14.

The valve housing 62 also has a master chamber 76 and a slave chamber 78 defined therein. A first end portion 82 of the master chamber 76 is fluidly coupled to the fluid inlet 64 via a fluid passage 80. Hence, pressurized hydraulic fluid is advanced from the pressurized hydraulic fluid source 68 is advanced to the master chamber 76 via a fluid path which includes the fluid line 70, the fluid inlet 64, and the fluid passage 80. A second end portion 84 of the master chamber 76 is fluidly coupled to the fluid outlet 66 via a fluid passage 86. Hence, hydraulic fluid is advanced from the master chamber 76 to the fluid reservoir 72 via a fluid path which includes the fluid passage 86, the fluid outlet 66, and the fluid line 74. Moreover, the master chamber 76 is fluidly coupled to the slave chamber 78 via a fluid passage 88.

The valve group 58 includes a master valve assembly 90 having a master valve member 92, along with a slave valve assembly 94 having a slave piston 96. As shown in FIG. 5, the master valve member 92 is positioned in the master chamber 76 and has three separate valve sections 98, 100, 102. The master valve member 92 may be selectively positioned in order to selectively provide for a flow of pressurized hydraulic fluid to the slave chamber 78. In particular, the master valve assembly 90 is an electrically-actuated valve assembly having an electrically-actuated solenoid 104. Actuation of the solenoid 104 urges the master valve member 92 leftwardly (as viewed in FIG. 5) into a position in which the master chamber 76 is placed in fluid communication with the slave chamber 78. In particular, actuation of the solenoid 104 urges the master valve member 92 leftwardly (as viewed in FIG. 5) so as to allow pressurized hydraulic fluid to flow through the fluid inlet 64, the fluid passage 80, the master chamber 76, the fluid passage 88, and into the slave chamber 78. Note that when the master valve member 92 is urged leftwardly in such a manner, the valve sections 100 and 102 prevent hydraulic fluid from being advanced through a pair of branches 106, 108, respectively, of the fluid line 86 thereby isolating the master chamber 76 from the reservoir 72.

Conversely, deactuation of the solenoid 104 urges the master valve member 92 rightwardly (as viewed in FIG. 5) into a position in which the first portion 82 of the master chamber 76 is isolated from the slave chamber 78. In particular, deactuation of the solenoid 104 urges the master valve member 92 rightwardly (as viewed in FIG. 5) into its position as shown in FIG. 5 in which the valve section 98 prevents pressurized hydraulic fluid from flowing from the master chamber 76 to the slave chamber 78 via the fluid passage 88. Note that when the master valve member 92 is urged rightwardly in such a manner, hydraulic fluid is allowed to advance through the branches 106, 108 of the fluid line 86 thereby draining any fluid within the second end portion 84 of the master chamber 76 to the reservoir 72.

The slave piston 96 is positioned in the slave chamber 78 thereby dividing the slave chamber 78 into a spring chamber portion 110 and a high-pressure chamber portion 112. A biasing spring 114 is positioned in the spring chamber portion 110 having a first end positioned in contact with the valve housing 62 and a second end positioned in contact with an outer surface of the master piston 96. The biasing spring 114 is provided to bias or otherwise urge the master piston 96 leftwardly (as viewed in FIG. 5) and into contact with a piston stop 116.

The slave piston 96 is preferably embodied as a stepped piston having a first end portion 118 and a second end portion 120. The first end portion 118 is positioned within the spring chamber portion 110 of the slave chamber 78, whereas the second end portion 120 of the slave piston 96 is positioned in the high-pressure chamber portion 112 of the slave chamber 78. As shown in FIG. 5, the diameter of the first end portion 118 of the slave piston 96 is greater than the diameter of the second end portion 120 of the slave piston 96. Such a configuration allows a relatively high output fluid pressure to be generated from a relatively small input fluid pressure. In particular, the first end portion 118 of the slave piston has a fluid contact surface 122, whereas the second end portion 120 of the slave piston has a fluid contact surface 124. The surface area of the fluid contact surface 122 is preferably approximately ten times greater than the surface area of the fluid contact surface 122. Hence, fluid pressure created by the second end portion 120 of the slave piston 96 is approximately ten times greater than the fluid pressure exerted on the fluid contact surface 122 of the first end portion 118 of the slave piston 96. For example, if hydraulic fluid pressurized to 400 pounds-per-square-inch is exerted on the first fluid contact surface 122 of the first end portion 118 of the slave piston 96, the pressure of the hydraulic fluid in the high-pressure chamber portion 112 of the slave chamber 78 will be increased to approximately 4,000 pounds-per-square-inch.

The slave chamber 78 also defines a fluid outlet 126 having a check valve assembly 128 positioned therein. The check valve assembly 128 has a ball 130 which is biased into a valve seat 132 by a biasing spring 134. The check valve assembly 128 is held in position within the valve housing 62 by a threaded cap 136. The valve housing 62 also has a fluid port 138 defined therein. The fluid port 138 is fluidly coupled to a fluid port 140 (see FIG. 4) defined in the cylinder housing 56 thereby placing the high-pressure chamber portion 112 of the slave chamber 78 in fluid communication with the fluid chamber 54 of the actuator 46. The check valve assembly 128 has a closed check position (as shown) in which the ball 130 is urged into contact with the valve seat 132 by the spring 134 thereby isolating the fluid chamber 54 of the actuator 46 from the high-pressure chamber 112 of the slave chamber 78. The check valve assembly 128 also has an open check position in which the ball 130 is urged rightwardly (as viewed in FIG. 5) so as to allow fluid to advance from the high-pressure chamber portion 112 of the slave chamber 78 to the fluid chamber 54 of the actuator 46. As shall be discussed below in greater detail, the ball 130 may be urged rightwardly in order to position the check valve assembly 128 into its open check position by the presence of fluid pressure of a predetermined magnitude within the high-pressure chamber portion 112 of the slave chamber 78. The ball 130 may also be urged rightwardly in order to position the check valve assembly 128 into its open check position by a contact protrusion 176 defined in the second end portion of the slave piston 96 during movement of the slave piston 96.

The valve group 58 also includes a pair of electrically-actuated control valves 142, 144. The control valve 142 selectively allows pressurized hydraulic fluid to be advanced from the pressurized hydraulic fluid source 68 (see FIG. 4) to the high-pressure chamber portion 112 of the slave chamber 78. In particular, the inlet of the control valve 142 is fluidly coupled to the fluid inlet 64 of the valve housing 62, whereas the outlet of the control valve 142 is fluidly coupled to the high-pressure chamber portion 112 of the slave chamber 78 via a fluid passage 146. The control valve 142 has a closed control position (as shown in FIG. 5) and an open control position. In particular, the control valve 142 includes an electrically-actuated solenoid 148 which, upon actuation thereof, causes the control valve 142 to shift from its closed control position to its open control position. Deactuation of the solenoid 148 cause the control valve 142 to shift from its open control position to its closed control position. It should be appreciated that when the control valve 142 is positioned in its closed control position, the high-pressure chamber portion 112 of the slave chamber 78 is isolated from the fluid inlet 64 (and hence the pressurized hydraulic fluid source 68), whereas when the control valve 142 is positioned in its open control position, the high-pressure chamber portion 112 of the slave chamber 78 is fluidly coupled to the fluid inlet 64 (and hence the pressurized hydraulic fluid source 68).

The control valve 144 selectively allows hydraulic fluid to be exhausted or otherwise drained from the high-pressure chamber portion 112 of the slave chamber 78 to the reservoir 72. In particular, the inlet of the control valve 144 is fluidly coupled to the high-pressure chamber portion 112 of the slave chamber 78 via a fluid passage 150, whereas the outlet of the control valve 144 is fluidly coupled to the fluid outlet 66 of the valve housing 62. The control valve 144 has a closed control position (as shown in FIG. 5) and an open control position. In particular, similarly to the control valve 142, the control valve 144 includes an electrically-actuated solenoid 152 which, upon actuation thereof, causes the control valve 144 to shift from its closed control position to its open control position. Deactuation of the solenoid 152 cause the control valve 142 to shift from its open control position to its closed control position. It should be appreciated that when the control valve 144 is positioned in its closed control position, the high-pressure chamber portion 112 of the slave chamber 78 is isolated from the fluid outlet 66 (and hence the reservoir 72), whereas when the control valve 144 is positioned in its open control position, the high-pressure chamber portion 112 of the slave chamber 78 is fluidly coupled to the fluid outlet 66 (and hence the reservoir 72).

As shown in FIG. 4, a position sensor 154 is positioned within the frame assembly 16 in order to monitor the position of a number of undercarriage components relative to one another. In particular, the position sensor 154 is provided to sense the position of the front frame member 32 relative to the rear frame member 34. As shall be discussed below in greater detail, the position of the front frame member 32 relative to the rear frame member 34 may be utilized to provide "closed loop" control of the tension on the drive track chain 28.

The position sensor 154 may be provided as any type of sensor which is capable of sensing the position of the front frame member 32 relative to the rear frame member 34. In an exemplary embodiment, the position sensor 154 is provided as a linear displacement transducer which senses the linear distance between a sensing location associated with the rear frame member 34 and a sensing location associated with the front frame member 32. For example, as shown in FIG. 4, the position sensor 154 may be utilized to sense a linear distance D between the location on the cylinder housing 56 at which the sensor 154 is secured (e.g. a sensing location associated with the rear frame member 34) and a designated sensing location 156 associated with the front frame member 32. One commercially available sensor which is particularly useful as the position sensor 154 of the present invention is a Series BTL-2 Linear Displacement Transducer which is commercially available Balluff, Incorporated of Florence, Ky.

Figure 6:
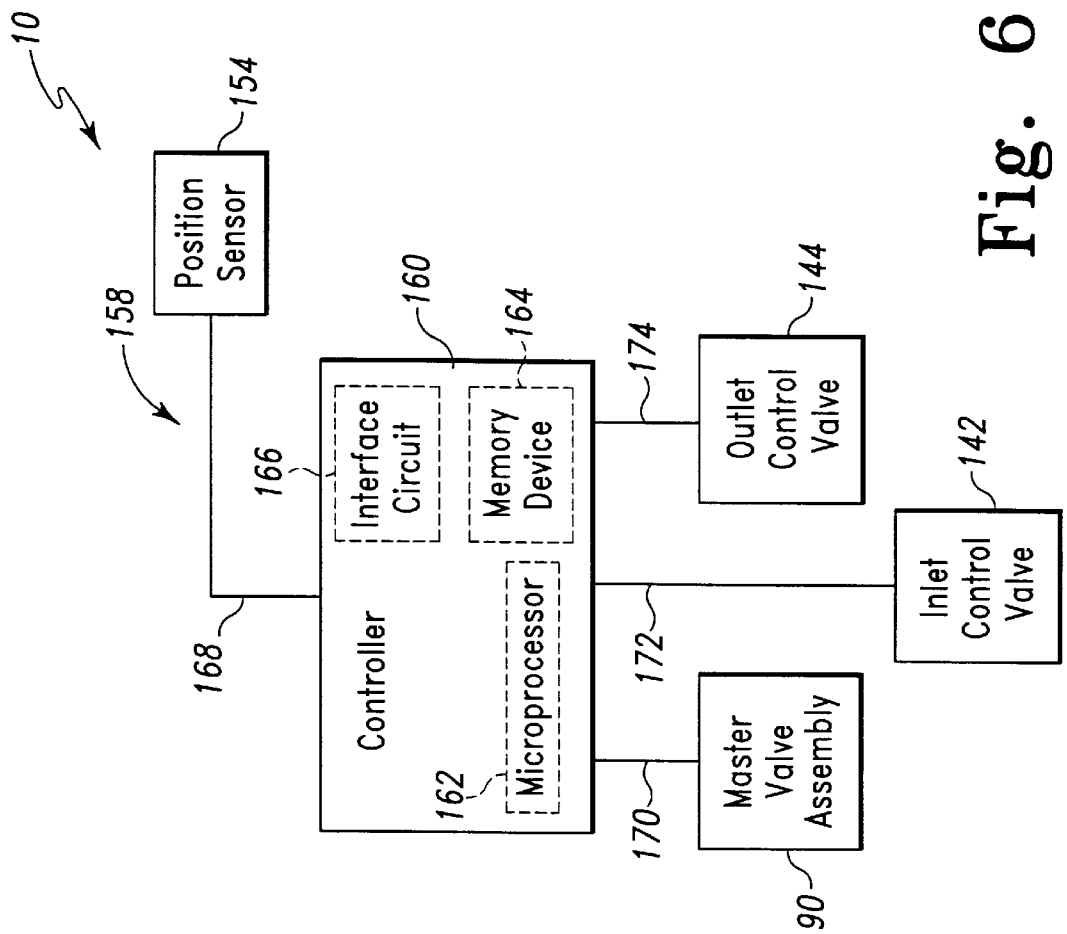
FIG. 6 is a simplified block diagram of a portion of the tractor of FIG. 1.

Referring now to FIG. 6, there is shown a simplified block diagram of a track tensioning control system 158 of the track-type tractor 10. As shown in FIG. 6, the master valve assembly 90, the inlet control valve 142, the outlet control valve 144, and the position sensor 154 are each electrically coupled to a processing unit such as a controller 160. The controller 160 may be a dedicated controller for controlling the components shown in FIG. 6, or may alternatively be integrated into another controller associated with the track-type tractor 10 such as the engine controller (not shown), transmission controller (not shown), or implement controller (not shown).

The controller 160 includes electrical components commonly found in other work machine controllers such as a microprocessor 162, a memory device 164, and an interface circuit 166. The interface circuit 166 converts the output signals from the position sensor 154 into a signal which is suitable for presentation to an input of the microprocessor 162. In particular, an analog-to-digital (A/D) converter (not shown) associated with the interface circuit 166 converts the analog voltage or other type of output signal generated by the position sensor 154 into a digital value for use by the microprocessor 162. It should be appreciated that the magnitude of the analog voltage generated by the position sensor 154 is indicative of the linear distance D between the front frame member 32 and the rear frame member 34.

The interface circuit 166 also converts output signals generated by the microprocessor 162 into a signal which is suitable for use by the solenoids 104, 148, 152 associated with the valves 90, 142, 144, respectively. In particular, the interface circuit 166 converts the output signals from the microprocessor into an analog actuation pulse which actuates the solenoids 104, 148, 152 thereby positioning the valves 90, 142, 144, respectively, into their respective actuated positions described above. It should be further appreciated that the interface circuit 166 may be embodied as a discrete device or number of devices, or may be integrated into the microprocessor 162.

The memory device 164 is provided to store the code or set of instructions which are executed by the controller 160 during operation of the track tensioning control system 158. Moreover, operation parameters may also be stored in the memory device 164. The memory device 164 may be embodied as any known memory device such as RAM and/or ROM devices.

As shown in FIG. 6, the position sensor 154 is electrically coupled to the controller 160 via a signal line 168. Hence, output signals generated by the position sensor 154 are communicated to the controller 160 via the signal line 168. As discussed above, such output signals may be generated and thereafter communicated by the position sensor in numerous forms. For example, the position sensor 154 may generate output signals in the form of an analog DC voltage or in the form of a signal utilizing current-to-pulse signal timing.

The master valve assembly 90 is also electrically coupled to the controller 160. In particular, the solenoid 104 of the master valve assembly 90 is electrically coupled to the controller 160 via a signal line 170. Hence, the controller 160 generates output signals in the form of actuation pulses on the signal line 170 which actuate the solenoid 104 thereby urging the master valve member 92 leftwardly (as viewed in FIG. 5) into a position in which the master chamber 76 is placed in fluid communication with the slave chamber 78 so as to allow pressurized hydraulic fluid to flow through the fluid inlet 64, the fluid passage 80, the master chamber 76, the fluid passage 88, and into the slave chamber 78. As discussed above, when the master valve member 92 is urged leftwardly in such a manner, the valve sections 100 and 102 prevent hydraulic fluid from being advanced through a pair of branches 106, 108, respectively, of the fluid line 86 thereby isolating the master chamber 76 from the reservoir 72.

When the controller 160 ceases to generate an actuation pulse on the signal line 170, the solenoid 104 is deactuated. As described above, deactuation of the solenoid 104 urges the master valve member 92 rightwardly (as viewed in FIG. 5) into a position in which the master chamber 76 is isolated from the slave chamber 78. Note also that when the master valve member 92 is urged rightwardly in such a manner, hydraulic fluid is allowed to advance through the branches 106, 108 of the fluid line 86 thereby draining any fluid within the second end portion 84 of the master chamber 76 to the reservoir 72.

Similarly, the inlet control valve 142 is electrically coupled to the controller 160. In particular, the solenoid 148 of the inlet control valve 142 is electrically coupled to the controller 160 via a signal line 172. Hence, the controller 160 generates output signals in the form of actuation pulses on the signal line 172 which actuate the solenoid 148 thereby shifting the inlet control valve 142 from its closed control position in which the high-pressure chamber portion 112 of the slave chamber 78 is isolated from the fluid inlet 64 to its open control position in which the high-pressure chamber portion 112 of the slave chamber 78 is fluidly coupled to the fluid inlet 64.

When the controller 160 ceases to generate an actuation pulse on the signal line 172, the solenoid 148 is deactuated. As described above, deactuation of the solenoid 148 causes the control valve 142 to shift from its open control position to its closed control position thereby isolating the high-pressure chamber portion 112 of the slave chamber 78 from the fluid inlet 64.

Moreover, the outlet control valve 144 is electrically coupled to the controller 160. In particular, the solenoid 152 of the outlet control valve 144 is electrically coupled to the controller 160 via a signal line 174. Hence, the controller 160 generates output signals in the form of actuation pulses on the signal line 174 which actuate the solenoid 152 thereby shifting the outlet control valve 144 from its closed control position in which the high-pressure chamber portion 112 of the slave chamber 78 is isolated from the fluid outlet 66 to its open control position in which the high-pressure chamber portion 112 of the slave chamber 78 is fluidly coupled to the fluid outlet 66.

When the controller 160 ceases to generate an actuation pulse on the signal line 172, the solenoid 148 is deactuated. As described above, deactuation of the solenoid 148 causes the control valve 142 to shift from its open control position to its closed control position thereby isolating the high-pressure chamber portion 112 of the slave chamber 78 from the fluid outlet 66.

The controller 160 communicates with each of the position sensor 154, the master valve assembly 90, the inlet control valve 142, and the outlet control valve 144 in order to maintain a desired level of tension on the drive track chain 28. In particular, the controller 160 initially executes a "zeroing" routine in which the controller 160 causes substantially all of the slack to be removed from the drive track chain 28. In order to accomplish this, the controller 160 generates an output signal on the signal line 172 so as to actuate the solenoid 148 of the inlet control valve 142 thereby causing pressurized hydraulic fluid to be advanced into the high-pressure chamber portion 112 of the slave chamber 78 from the fluid inlet 64. Thereafter, the controller 160 generates an output signal on the signal line 170 so as to actuate the solenoid 104 associated with the master valve assembly 90 thereby causing pressurized hydraulic fluid to be advanced into the spring chamber portion 110 of the slave chamber 78.

The presence of pressurized hydraulic fluid in the spring chamber portion 110 of the slave chamber 78 urges the slave piston 96 rightwardly (as viewed in FIG. 5) thereby increasing fluid pressure in the high-pressure chamber portion 112 of the slave chamber 78. Once fluid pressure in the high-pressure chamber portion 112 of the slave chamber 78 has increased to a predetermined level, the ball 130 of the check valve assembly 128 is urged off of the valve seat 132 thereby causing pressurized hydraulic fluid to be advanced out the fluid port 138 and into the fluid chamber 54 of the actuator 46 via the fluid port 140 (see FIG. 4). The presence of the additional hydraulic fluid increases the fluid pressure within the fluid chamber 54 thereby urging the piston 48 of the actuator 46 in the forward direction (i.e. in the general direction of arrow 42 of FIGS. 2 and 4). Such forward movement of the piston 48 likewise urges the front frame member 32 and hence the front idler wheel 22 in the forward direction (i.e. in the general direction of arrow 42 of FIGS. 2 and 4) thereby increasing tension on the drive track chain 28. It should be appreciated that the above-described procedure may be repeated until substantially all of the slack has been removed from the drive track chain 28. It should be appreciated that numerous techniques may be utilized to determine when substantially all of the slack has been removed from the drive track chain 28. For example, visual inspection of the drive track chain 28 may be performed in order to determine when the track chain 28 is taut or otherwise has substantially all of the slack removed therefrom. Moreover, a pressure sensor may be utilized to determine when fluid pressure within the fluid chamber 54 increases to a pressure level that is indicative of substantially all of the slack having been removed from the drive track chain 28. In addition, the position sensor 154 may be utilized to determine if subsequent additions of hydraulic fluid into the fluid chamber 54 are unable to further extend the piston 48 (i.e. unable to further move the front frame member 32 relative to the rear frame member 34) thereby indicating that substantially all of the slack has been removed from the drive track chain 28.

In any event, once the controller 160 has established a "zero position" (i.e. substantially all of the slack has been removed from the drive track chain 28), a predetermined amount of hydraulic fluid is then removed from the fluid chamber 54 in order to retract or otherwise move the piston 48 in a rearward direction (i.e. in the general direction of arrow 44 of FIGS. 2 and 4) by a predetermined distance. In particular, the controller 160 generates an output signal on the signal line 174 in order to actuate the solenoid 152 associated with the outlet control valve 144 thereby placing the high-pressure chamber portion 112 of the slave chamber 78 in fluid communication with the fluid outlet 66 (and hence the fluid reservoir 72). The controller 160 also generates an output signal on the signal line 170 so as to actuate the solenoid 104 associated with the master valve assembly 90 thereby causing pressurized hydraulic fluid to be advanced into the spring chamber portion 110 of the slave chamber 78. The presence of pressurized hydraulic fluid in the spring chamber portion 110 of the slave chamber 78 urges the slave piston 96 rightwardly (as viewed in FIG. 5) thereby causing the contact protrusion 176 to urge the ball 132 of the check valve assembly 128 off of its valve seat 132. Once the ball 130 is unseated, hydraulic fluid is allowed to flow out of the fluid chamber 54 of the actuator 46, through the ports 140, 138, and out the fluid outlet 66 thereby retracting or otherwise moving the piston 48 in a rearward direction (i.e. in the general direction of arrow 44 of FIGS. 2 and 4) thereby decreasing tension on the drive track chain 28. Once the position sensor 154 detects that the front frame member 32 has been moved rearwardly by the predetermined distance, the controller 160 ceases to generate output signals on the signal lines 170, 174 thereby ceasing retraction of the piston 48 of the actuator 46 so as to position the front frame member 32 (and hence the front idler wheel 22) in a "target position". It should be appreciated that retraction of the piston 48 by the predetermined distance creates a corresponding predetermined amount of slack in the drive track chain 28.

Thereafter, the position sensor 154 is utilized to maintain the front frame member 32 (and hence the front idler wheel 22) in the target position. In particular, if the position sensor 154 detects that the linear distance D from the front frame member 32 to the rear frame member 34 decreases below a predetermined distance value with respect to the target position of the front frame member 32 thereby indicating that tension on the drive track chain has decreased, the controller 160 generates output control signals which control operation of the master valve assembly 90 and the inlet control valve 142 so as to increase fluid pressure in the fluid chamber 54 of the actuator 48 in the manner described above so as to move the front frame member 32 in the forward direction (i.e. in the general direction of arrow 42 of FIGS. 2 and 4) so as to incrementally increase tension on the drive track chain 28. Once the front frame member 32 has been advanced back to the target position (as sensed by the position sensor 154) the controller 160 ceases to increase fluid pressure in the fluid chamber 54 thereby ceasing forward advancement of the piston 48.

Conversely, if the position sensor 154 detects that the linear distance D from the front frame member 32 to the rear frame member 34 increases above the predetermined distance value with respect to the target position of the front frame member 32 thereby indicating that tension on the drive track chain has increased, the controller 160 generates output control signals which control operation of the master valve assembly 90 and the outlet control valve 144 so as to incrementally decrease fluid pressure in the fluid chamber 54 of the actuator 48 in the manner described above so as to move the front frame member 32 in the rearward direction (i.e. in the general direction of arrow 44 of FIGS. 2 and 4) so as to decrease tension on the drive track chain 28. Once the front frame member 32 has been advanced back to the target position (as sensed by the position sensor 154) the controller 160 ceases to decrease fluid pressure in the fluid chamber 54 thereby ceasing rearward advancement of the piston 48.

It should be appreciated that such "closed loop" control of the tension on the drive track chain 28 prevents the track-type tractor 10 from being operated for a period of time with an undesirable amount of tension (either too high or too low) in the drive track chain 28 thereby increasing the efficiency tractor 10 while also increasing the useful life of the components associated with the undercarriage assembly 16. Moreover, it should be appreciated that the controller 160 may also be configured to automatically re-execute the "zeroing" procedure at predetermined intervals so as to account for normal wear in the components associated with the drive track chain 28.

Moreover, it should be appreciated that a pressure relief valve (not shown) may be fluidly interposed between the fluid port 138 of the valve group 58 and the fluid port 140 of the actuator 46 in order to provide a recoil function to the undercarriage assembly 16. In particular, if a rock or the like is ingested by the undercarriage assembly 16 during advancement of the track-type tractor 10, the front idler wheel 22 is urged or otherwise moved rearwardly (i.e. in the general direction of arrow 44 of FIGS. 2 and 4) thereby increasing fluid pressure in the fluid chamber 54 of the actuator 46. Once fluid pressure within the fluid chamber 54 is greater in magnitude than the relief setting of the pressure relief valve (e.g. 6,000 pounds-per-square-inch), hydraulic fluid within the fluid chamber 54 is exhausted to the reservoir via the pressure relief valve thereby allowing the piston 48 (and hence the front frame member 32 and the front idler wheel 22) to be urged or otherwise moved in the rearward direction (i.e. in the general direction of arrow 44 of FIGS. 2 and 4) thereby providing relief or slack in the drive track chain 28. It should be appreciated that such relief in the drive track chain 28 facilitates expulsion of the rock from the undercarriage assembly 16.

Once the rock has been expelled from the undercarriage assembly 16, the front frame member 32 is returned to its previous target position thereby returning the drive track chain 28 to its previous tension level. In particular, the controller 160 controls actuation of the valves 90, 142, and 144 based on output from the position sensor 154 in order to return the front frame member 32 (and hence the front idler wheel 22) to its previous target position thereby returning the drive track chain 28 to its previous tension level. It should be appreciated that the controller 160 may alternatively be configured to execute the "zeroing procedure" so as to reset the target position of the front frame member 32 after each recoil event.

Figure 7:
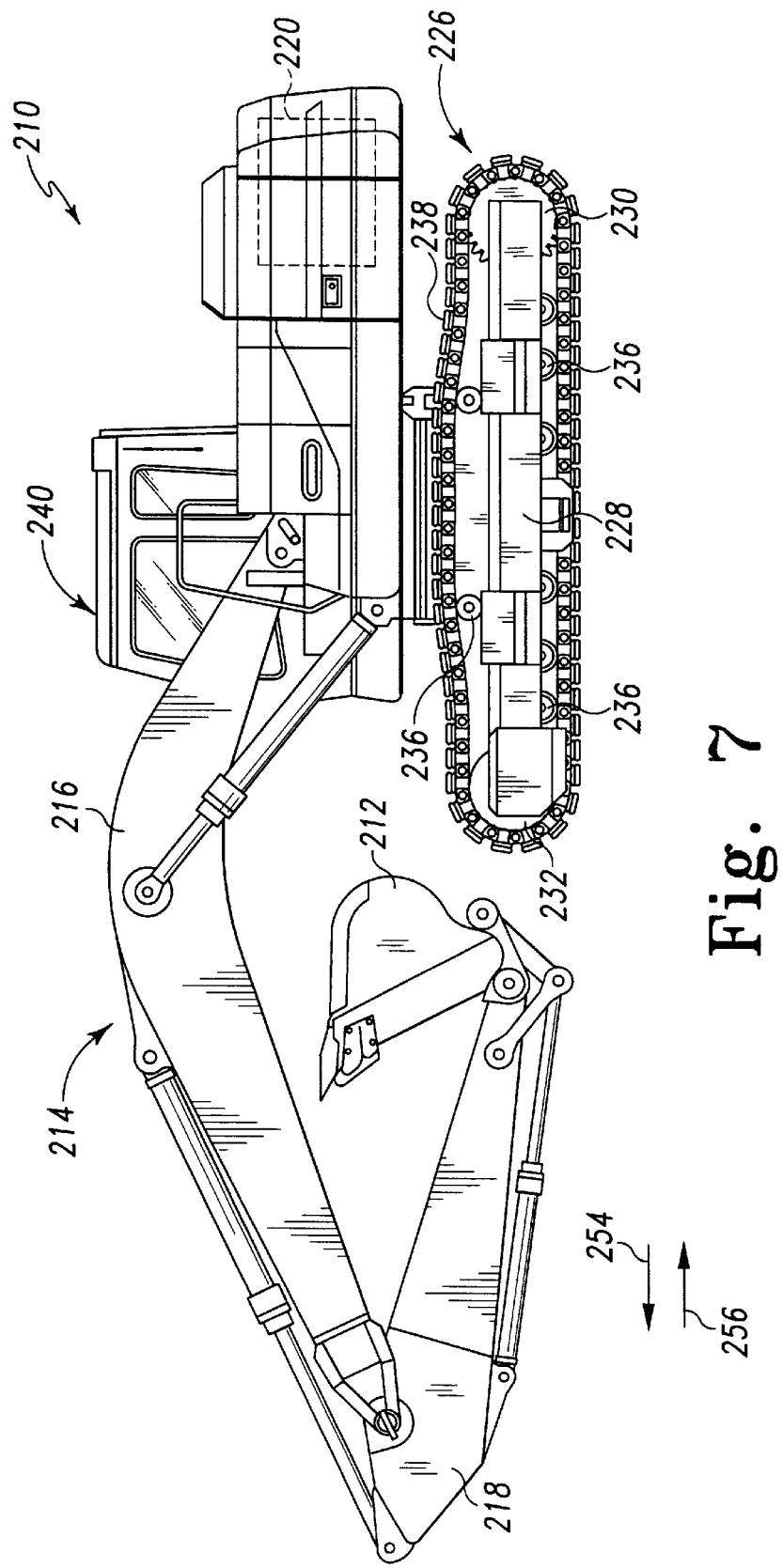
FIG. 7 is a side elevational view of an excavator which incorporates the features of the present invention therein.

Referring now to FIG. 7, there is shown another type of work machine such as a hydraulic excavator 210 which is utilized to perform numerous work functions such as digging and material movement. The excavator 210 includes a number of work implements such as a hydraulically-powered bucket assembly 212 which is secured to an end of a boom assembly 214 having a boom arm 216 and a stick assembly 218. The excavator 210 further includes an engine such as a diesel engine 220 for providing the motive power for both advancing the excavator 210 and operating the bucket 212 and boom assembly 214.

The excavator 210 also includes an undercarriage assembly 226. The undercarriage assembly 226 includes a frame assembly 228, a drive sprocket 230, a front idler wheel 232, and a number of midroller assemblies 236. An endless drive track chain 238 is driven by the drive sprocket 230 so as to be advanced around the front idler wheel 232 and each of the midroller assemblies 236 thereby providing the motive power for advancing the excavator 210. In particular, mechanical output from the engine 220 is transmitted to the drive sprocket 230 via a hydraulic drive system 240 having a number of hydraulic drive motors 304 (see FIGS. 9 and 10) which drive the drive sprocket 230 so as to advance the drive track chain 238 and hence the excavator 210. It should be appreciated that although only one side of the excavator 210 is shown in FIG. 7, the other side of the excavator 210 would also include an undercarriage assembly 226 having similar components as those shown in FIG. 7 (e.g. a frame assembly 228, drive sprocket 230, front idler wheel 232, midroller assemblies 236, and drive track chain 238).

The excavator 210 also includes a cab 240. The cab 240 is provided to enclose or otherwise house the devices associated with the excavator 210 which are utilized by an operator during operation of the excavator 210. In particular, the cab 240 houses an operator seat (not shown) and a number of control devices 242 such as, for example, a control lever assembly 466 and a foot pedal assembly 246 (see FIG. 15).

Figure 8:
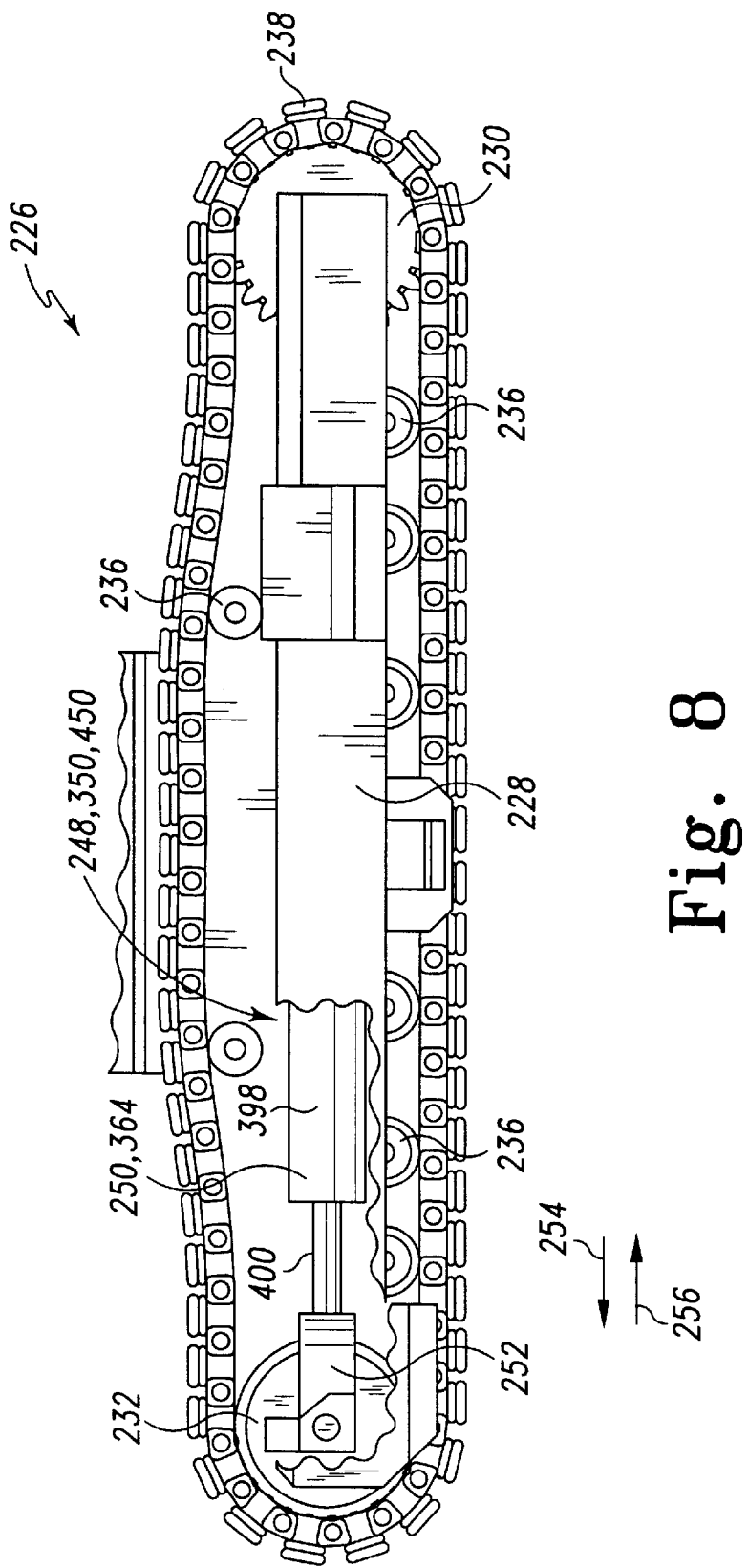
FIG. 8 is an enlarged, partially cutaway side elevational view of the undercarriage assembly of the excavator of FIG. 7.
Figure 9:
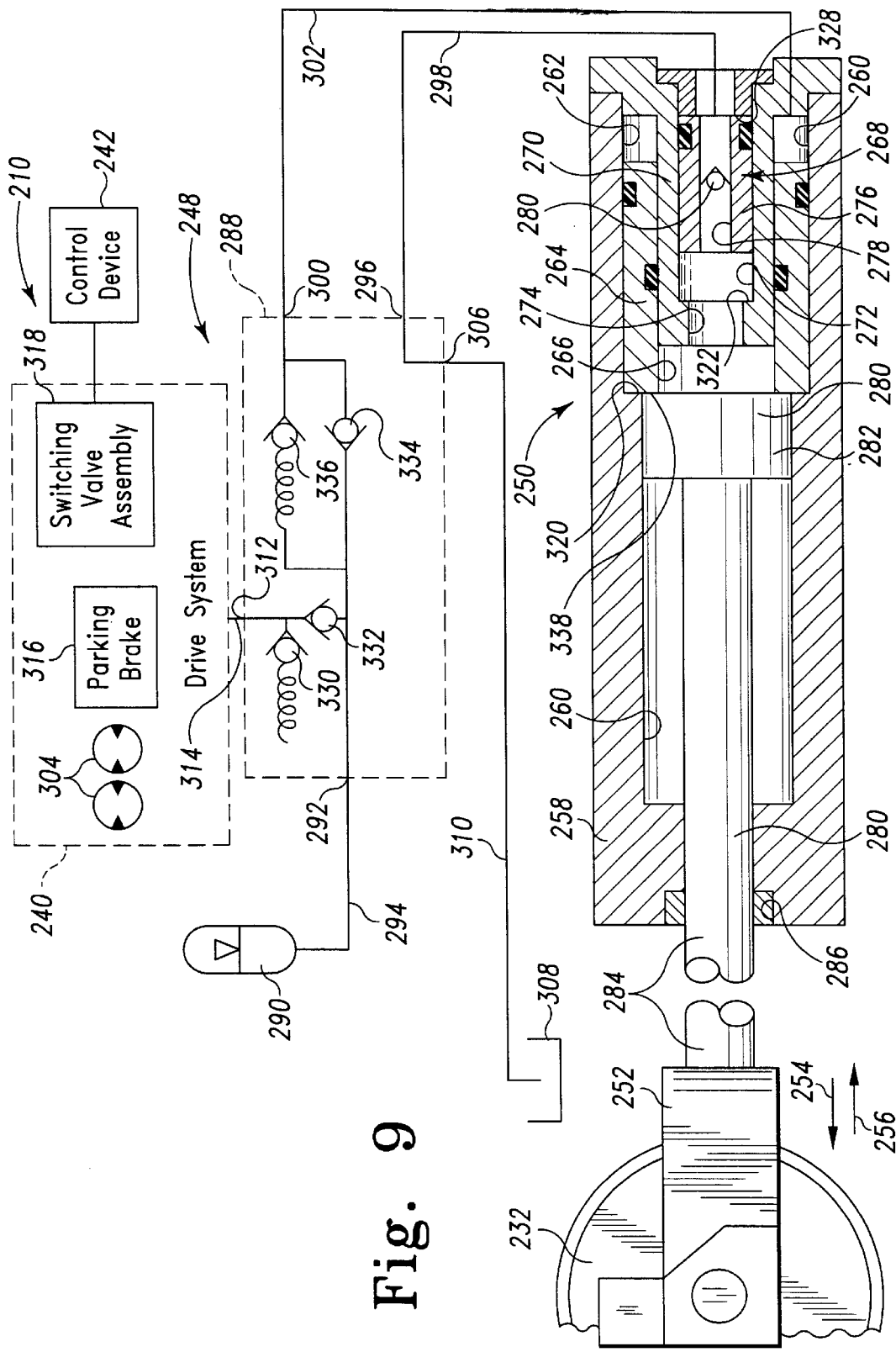
FIG. 9 is a cross sectional view of the of the undercarriage assembly of FIG. 8 which shows the track tensioning assembly positioned in its retracted position (note that the control valve is schematically shown in FIG. 9 for clarity of description)
Figure 10:
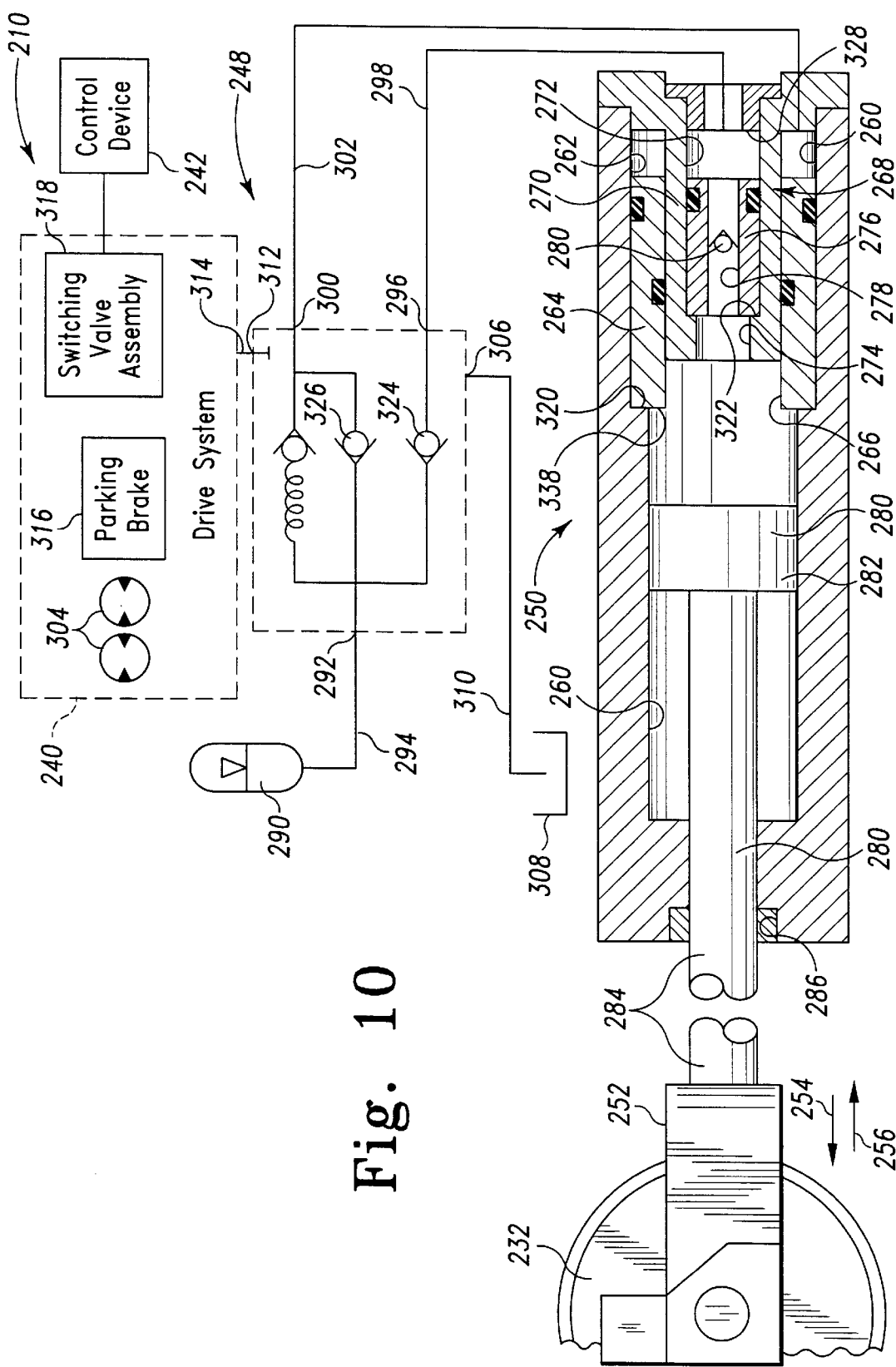
FIG. 10 is a view similar to FIG. 9, but showing the track tensioning assembly positioned in its extended position.

As shown in more detail in FIGS. 8–10, the undercarriage assembly 226 includes a track tensioning assembly 248. The track tensioning assembly 248 includes a cylinder assembly 250 having a yoke 252 secured thereto. As shown in FIG. 8, the front idler wheel 232 is rotatably coupled to the yoke 252. Movement of the yoke 252 and hence the front idler wheel 232 in a forward direction (i.e. in the general direction of arrow 254 of FIG. 8) increases tension of the drive track chain 238. Conversely, movement of the yoke 252 and hence the front idler wheel 232 in a rearward direction (i.e. in the general direction of arrow 256 of FIG. 8) decreases tension of the drive track chain 238.

As shown in FIGS. 9 and 10, the cylinder assembly 250 includes a main housing 258 having a main chamber 260 defined therein. The main chamber 260 includes a recoil subchamber 262 which has a recoil piston 264 positioned therein. As shall be discussed below in greater detail, the recoil piston 264 provides a recoil function to the undercarriage assembly 226. In particular, if a rock or the like is ingested by the undercarriage assembly 226 during advancement of the excavator 210, use of the recoil piston 264 facilitates expulsion of the rock from the undercarriage assembly 226 without damage to the components associated with the undercarriage assembly 226 such as the drive track chain 238.

The recoil piston 264 has a central passage 266 defined therein. A master piston assembly 268 is secured within the central passage 266. The master piston assembly 268 includes a housing 270 having a master chamber 272 and an outlet port 274 defined therein. A master piston 276 is positioned within the master chamber 272 in order to translate back and forth therein. The master piston 276 has a central passage 278 defined therein. A check valve assembly 280 is positioned within the central passage 278 of the master piston 276.

The cylinder assembly 250 further includes a slave piston 280 having a head end portion 282 positioned within the main chamber 260 and a rod end portion 284 which extends out of a sealed opening 286 defined in the main housing 258. As shown in FIG. 9, the rod end portion 284 is secured to the yoke 252 and hence the idler wheel 232. Therefore, as the head end portion 282 of the slave piston 280 is moved in the forward direction (i.e. in the general direction of arrow 254 of FIGS. 8–10), the yoke 252 and hence the front idler wheel 232 are likewise moved in the forward direction thereby increasing tension of the drive track chain 238. Conversely, as the head end portion 282 of the slave piston 280 is moved in the rearward direction (i.e. in the general direction of arrow 256 of FIGS. 8–10), the yoke 252 and hence the front idler wheel 232 are likewise moved in the rearward direction thereby decreasing tension of the drive track chain 238.

The track tensioning assembly 248 further includes a control valve assembly 288 and a nitrogen-charged fluid accumulator 290. The accumulator 290 is coupled to a fluid port 292 of the control valve assembly 288 via a fluid line 294. The recoil subchamber 262 is coupled to a fluid port 300 of the control valve assembly 288 via a fluid line 302, whereas the master chamber 272 of the master piston assembly 268 is coupled to a fluid port 296 of the control valve assembly 288 via a fluid line 298. A fluid outlet port 306 of the control valve assembly 288 is fluidly coupled to a fluid reservoir 308 via a drain line 310.

A pilot fluid port 312 is fluidly coupled to one or more components associated with the hydraulic drive system 240 of the excavator 210 via a fluid line 314. In particular, as described above, the hydraulic drive system 240 of the excavator 210 includes a number of hydraulic drive motors 304 for driving the drive sprockets 230 of the undercarriage assemblies 226. Moreover, the hydraulic drive system 240 includes a hydraulically-deactuated parking brake 316. The parking brake 316 includes a retaining spring (not shown) which retains the excavator 210 in a relatively stationary position when the parking brake 316 is actuated. The retaining spring is released by a flow of pressurized hydraulic fluid into a spring chamber (not shown) which houses the retaining spring so as to allow the excavator 210 to be advanced from one location to another.

The hydraulic drive system 240 also includes a switching valve assembly 318 which is operatively coupled to the operator control devices 242 located within the cab 240. The switching valve assembly 318 selectively provides for a flow of pressurized hydraulic fluid to the components associated with the hydraulic drive system 240 and the implements associated with the excavator 210 based on manipulation of the control devices 242 by the operator of the excavator 210. In particular, the hydraulic excavator 210 includes a main fluid supply circuit 488 (see FIG. 15) which includes the fluid components necessary to supply pressurized hydraulic fluid the drive system 240 and the hydraulic implements associated with the excavator 210. Amongst other functions, the switching valve assembly 318 directs pressurized hydraulic fluid from the main fluid supply circuit 488 to both the drive system 240 and an implement supply circuit 464 (see FIG. 15). Hence, if the operator manipulates one of the control devices in order to advance the excavator 210, fluid is directed from the main fluid supply circuit 488 to the components associated with the drive system 240 by the switching valve assembly 318. Conversely, if the operator manipulates one of the control devices in order to operate a work implement such as the bucket 212, fluid is directed from the main fluid supply circuit 488 to the implement supply circuit 464 by the switching valve assembly 318. As a particular example, if the operator manipulates one of the control devices 242 in order to release the parking brake 316, the switching valve assembly 318 directs pressurized hydraulic fluid to the spring chamber associated with the parking brake 316 so as to release the brake 316. Similarly, if the operator manipulates one of the control devices 242 such as the foot pedal 246 (see FIG. 15) in order to advance the excavator 210, the switching valve assembly 318 directs pressurized hydraulic fluid to the appropriate drive motors 304.

The control valve assembly 288 of the track tensioning assembly 248 is positionable in a number of control positions based on the activity being performed by the excavator 210 in order to selectively increase or decrease tension on the drive track chain 238. Such adjustment of track tension provides the excavator 210 of the present invention with numerous advantages over heretofore designed excavators. For example, when the excavator 210 is performing a work function such as a digging function or a material handling function, the track tensioning system 248 of the present invention increases tension on the drive track chain 238 so as to remove substantially all of the slack therefrom. Removal of substantially all of the slack from the drive track chain 238 prevents the undercarriage assembly 226 from rolling back and forth within the interior of the drive track chain 238. However, the track tensioning system 248 of the present invention decreases tension on the drive track chain 238 when the excavator 210 is being advanced in order to reduce wear on the components associated with the undercarriage assembly 226 thereby increasing the useful life of the excavator 210.

It should be appreciated that actuation or deactuation of the hydraulic drive system 240 may be monitored in order to determine the activity being performed by the excavator 210. For example, an increase in fluid pressure in the fluid supply lines (not shown) which supply the hydraulic motors 304 is indicative of advancement (i.e. movement) of the excavator 210. Similarly, a decrease in fluid pressure in the fluid supply lines which supply the hydraulic motors 304 is indicative of the excavator 210 being maintained in a stationary position (i.e. not moving or otherwise being advanced) such as when the excavator 210 is performing a work function (e.g. a digging function or material handling function). Moreover, an increase in fluid pressure in the fluid supply line (not shown) which supplies the hydraulically-deactuated parking brake 316 is indicative of the operator preparing to advance the excavator 210. Similarly, fluid pressure in any of the fluid lines associated with the switching valves associated with the switching valve assembly 318 may also be monitored to determine if the excavator 210 is being advanced or being maintained in a stationary position. Moreover, an increase in fluid pressure in the fluid supply lines (not shown) which supply hydraulic fluid to fluid cylinders associated with the boom assembly 214 and the bucket 212 (see FIG. 7) is indicative of the excavator 210 being operated to perform a work function.

From the above discussion, it should be appreciated that the fluid line 314 may be fluidly coupled to any one of numerous components associated with the hydraulic drive system 240 (or the implement fluid supply circuit 464) in order to communicate changes in hydraulic pressure to the pilot fluid port 312 of the control valve assembly 288. It should be appreciated that such changes in hydraulic pressure are indicative of the hydraulic drive system 240 being switched between its actuated mode of operation in which the drive system 240 causes advancement of the excavator 210 from one location to another and its deactuated mode of operation in which the drive system 240 does not advance the excavator 210. In an exemplary embodiment, the fluid line 314 is fluidly coupled to the fluid inlet line of the parking brake 316. In such a configuration, the control valve assembly 288 is placed in an increase-tension position (as shown in FIG. 10) when relatively low fluid pressure is sensed in the fluid inlet line of the parking brake 316. However, if an increase in fluid pressure is sensed in the fluid inlet line of the parking brake 316 thereby indicating that the brake 316 is being released, the control valve assembly 288 is positioned in its decrease-tension position, as shown in FIG. 9.

As shown in FIG. 10, when the control valve assembly 288 is positioned in its increase-tension position, pressurized hydraulic fluid is advanced from the accumulator 290 to each of the fluid lines 298, 302, and therefore into the recoil subchamber 262 and the master chamber 272. Presence of pressurized hydraulic fluid in the recoil subchamber 262 urges the recoil piston 264 leftwardly (as viewed in FIGS. 9 and 10) against a stop 320. Pressurized hydraulic fluid in the master chamber 272 is advanced through the central passage 278 define in the master piston 276, through the check valve 280, and out the outlet port 274 of the housing 270. The check valve 280 maintains a small differential fluid pressure between the master chamber 272 and the outlet port 274 thereby urging the master piston 276 leftwardly (as viewed in FIGS. 9 and 10).

Such leftward movement of the master piston 276 increases fluid pressure in the main chamber 260 so as to urge the head end portion 282 of the slave piston 280 in the forward direction (i.e. in the general direction of arrows 254 of FIGS. 8–10) thereby likewise moving the front idler wheel 232 in the forward direction. Pressurized hydraulic fluid from the fluid accumulator 290 will continue to urge the idler wheel 232 in the forward direction until substantially all of the slack is removed from the drive track chain 238 (i.e. the track is taut) or until the master piston 276 is advanced into contact with a stop 322. It should be appreciated that if the accumulator 290 is depleted of hydraulic fluid without substantially all of the slack being removed from the drive track chain 238, the above procedure may be cycled through again in order to produce such a result.

It should be appreciated that increasing tension on the drive track chain 238 during a digging operation facilitates operation of the excavator 210. In particular, by removing substantially all of the slack from the drive track chain 238, the excavator 210 is less likely to roll back and forth within the inner portion of the drive track chain 238. Moreover, as shown in FIG. 10, a pair of check valves 324, 326 within the control valve assembly 288 are provided to minimize, if not eliminate, movement of the components associated with the track tensioning assembly 248 (and hence the front idler wheel 232) due to implement forces generated by the boom assembly 214 and the bucket 212 during operation thereof. This further eliminates undesirable movement of the undercarriage assembly 226 during performance of a work function.

As described above, if an increase in fluid pressure is sensed in the fluid inlet line of the parking brake 316 thereby indicating that the brake 316 is being released, the control valve assembly 288 is positioned in its decrease-tension position, as shown in FIG. 9. When the control valve assembly 288 is positioned in its decrease-tension position, pressurized hydraulic fluid continues to be advanced from the accumulator 290, along with fluid pressure from the drive system 240, to the fluid line 302 and hence into the recoil subchamber 262. As before, presence of pressurized hydraulic fluid in the recoil subchamber 262 urges the recoil piston 264 leftwardly (as viewed in FIGS. 9 and 10) against the stop 320.

However, when the control valve assembly 288 is positioned in its decrease-tension position, hydraulic fluid within the master chamber 272 is exhausted or otherwise vented to the reservoir 308 thereby allowing pressurized fluid within the fluid outlet 274 and the main chamber 260 (which is isolated from the reservoir 308 by the check valve 280) to urge the master piston 276 in a rightwardly direction (as viewed in FIGS. 9 and 10) until movement of the master piston 276 is stopped by a stop 328.

Such rightward movement of the master piston 276 decreases fluid pressure in the main chamber 260 so as to urge the head end portion 282 of the slave piston 280 in the rearward direction (i.e. in the general direction of arrow 256 of FIGS. 8–10) thereby likewise moving the front idler wheel 232 in the rearward direction. The distance in which the idler wheel 232 is retracted (i.e. moved in the general direction of arrow 256 of FIGS. 8–10) corresponds to the stroke length of the master piston 276. In an exemplary embodiment, a desirable traveling track tension level is achieved by retracting the front idler wheel 232 approximately ten millimeters from the point at which substantially all of the slack has been removed from the drive track chain 238 (i.e. the point at which the front idler 232 is positioned during performance of a work function). Hence, the master piston assembly 268 is configured such that the master piston 276 has a stroke length which causes the front idler to be retracted approximately ten millimeters when the master piston 276 is urged rightwardly against the stop 328.

It should be appreciated that the hydraulic fluid lost during venting of the master chamber 272 is replaced in the accumulator 290 by use of hydraulic fluid from the drive system 240. In particular, a pressure regulation valve 330 in the control valve assembly 288 provides fluid pressure at the fluid port 292 (via a check valve 332) which is greater than the pressure maintained by the accumulator 290. This increases the pressure in the accumulator 290 by forcing additional fluid therein thereby replacing the fluid which was lost during venting of the master chamber 272. In an exemplary embodiment, the pressure regulation valve 330 maintains fluid pressure from the drive system 240 at 2,000 pounds-per-square-inch, whereas the accumulator 290 provides fluid pressure at 1,875 pounds-per-square-inch. Hence, when fluidly coupled to the drive system 240, fluid pressure from the drive system 240 (2,000 psi) is greater than fluid pressure within the accumulator 290 (1,875 psi) thereby forcing additional fluid into the accumulator 290. It should be appreciated that when the control valve assembly 288 is switched back to its increase-tension position (see FIG. 10) the stored fluid pressure in the accumulator 290 urges the master piston 276 leftwardly (as viewed in FIGS. 9 and 10) thereby dropping fluid pressure within the accumulator back to its normal pressure (e.g. back to 1,875 psi from 2,000 psi).

As described above, such loosening of the drive track chain 238 prior to advancement of the excavator 210 provides numerous advantages over heretofore designed excavators. For example, by loosening or otherwise decreasing tension on the drive track chain 238 by a predetermined amount prior to advancement of the excavator 210, wear on components associated with the undercarriage assembly 226 is reduced thereby increasing the efficiency and even the useful life of the excavator 210.

Moreover, it should be appreciated that the design of the track tensioning system 248 provides a recoil function to the undercarriage assembly 226 thereby eliminating the need for a separate recoil assembly such as a spring or the like. In particular, a combination of a check valve 334 and pressure relief valve 336 allows for selective movement of the recoil piston 264 in the event that a rock or the like is ingested by the undercarriage assembly 226 during advancement of the excavator 210. Such movement of the recoil piston 264 causes corresponding movement of the front idler wheel 232. In particular, if during advancement of the excavator 210, a rock or the like is ingested by the undercarriage assembly 226 thereby urging the idler wheel 232 and hence the piston head end 282 of the slave piston rearwardly (i.e. in the general direction of arrow 256 of FIGS. 8–10), fluid pressure is exerted on a first end 338 of the recoil piston 264 thereby increasing fluid pressure in the recoil subchamber 262. Hydraulic fluid is prevented from flowing from the recoil subchamber 262 back to the accumulator 290 by the check valve 334. However, if fluid pressure in the recoil subchamber 262 increases beyond the relief setting of the pressure relief valve 336 (e.g. 6,000 psi), the relief valve 336 opens thereby allowing fluid to be advanced from the recoil subchamber 262 to the accumulator 290. This causes rightward movement of the recoil piston 264 (as viewed in FIGS. 9 and 10) thereby allowing the slave piston 280 and hence the idler wheel 232 to be moved in a rearward direction (i.e. in the general direction of arrow 256 of FIGS. 9–10) thereby providing relief or slack in the drive track chain 238. It should be appreciated that such relief in the drive track chain 238 facilitates expulsion of the rock from the undercarriage assembly 226.

Once the rock has been expelled from the undercarriage assembly 226, fluid pressure from the accumulator 290 is returned to the recoil subchamber 262 thereby again urging the recoil piston leftwardly (as viewed in FIGS. 9 and 10) against the stop 320 which returns the slave piston 280 and hence the idler wheel 232 to their previous positions thereby returning the drive track chain 238 to its previous tension setting. It should be appreciated that such a configuration of the track tensioning assembly 248 provides a recoil response with a relatively efficient hysteresis loop relative to heretofore designed recoil assemblies. In particular, return flow from the recoil subchamber 262 to the accumulator 290 must flow through the relief valve 336 thereby generating a relatively large recoil force (e.g. 6,000 psi), however, flow from the accumulator 290 back to the recoil subchamber 262 is allowed to pass unrestricted by the check valve 334 thereby producing a relatively low pressure recoil recovery.

Hence, as described herein, the track tensioning assembly 248 provides numerous advantages over heretofore designed track tensioning assemblies. For example, by automatically switching between a relatively taut track configuration and a loosened track configuration, the excavator 210 is prevented from rolling back and forth during a digging operation, but yet also gains the benefit of decreased undercarriage component wear. Moreover, the design of the track tensioning assembly 248 facilitates its integration into existing excavator designs. In particular, existing excavator designs typically do not include a source of pressurized hydraulic fluid within the undercarriage assembly when the excavator is performing a digging operation. This is true since the excavator is generally not advanced during a digging operation thereby eliminating the need for hydraulic pressure within the undercarriage assembly. However, use of the accumulator 290 for the storing of hydraulic pressure eliminates the need for an active pressure source thereby facilitating ease of retrofit of the track tensioning assembly 248 into existing excavator designs.

Referring now to FIGS. 11–14, there is shown a second embodiment of a track tensioning assembly 350 which may be utilized in conjunction with the excavator 210. As shall be discussed below in greater detail, the track tensioning assembly 350 performs similar functions as the track tensioning assembly 248. In particular, the track tensioning assembly 350 is configured to provide a relatively taut track configuration in order to prevent the excavator 210 from rolling back and forth during a digging operation, but then loosen the tension on the drive track chain 238 during advancement of the excavator 210 in order to decrease undercarriage component wear. Moreover, the track tensioning assembly 350 also provides a recoil function thereby eliminating the need to provide separate recoil components.

Figure 11:
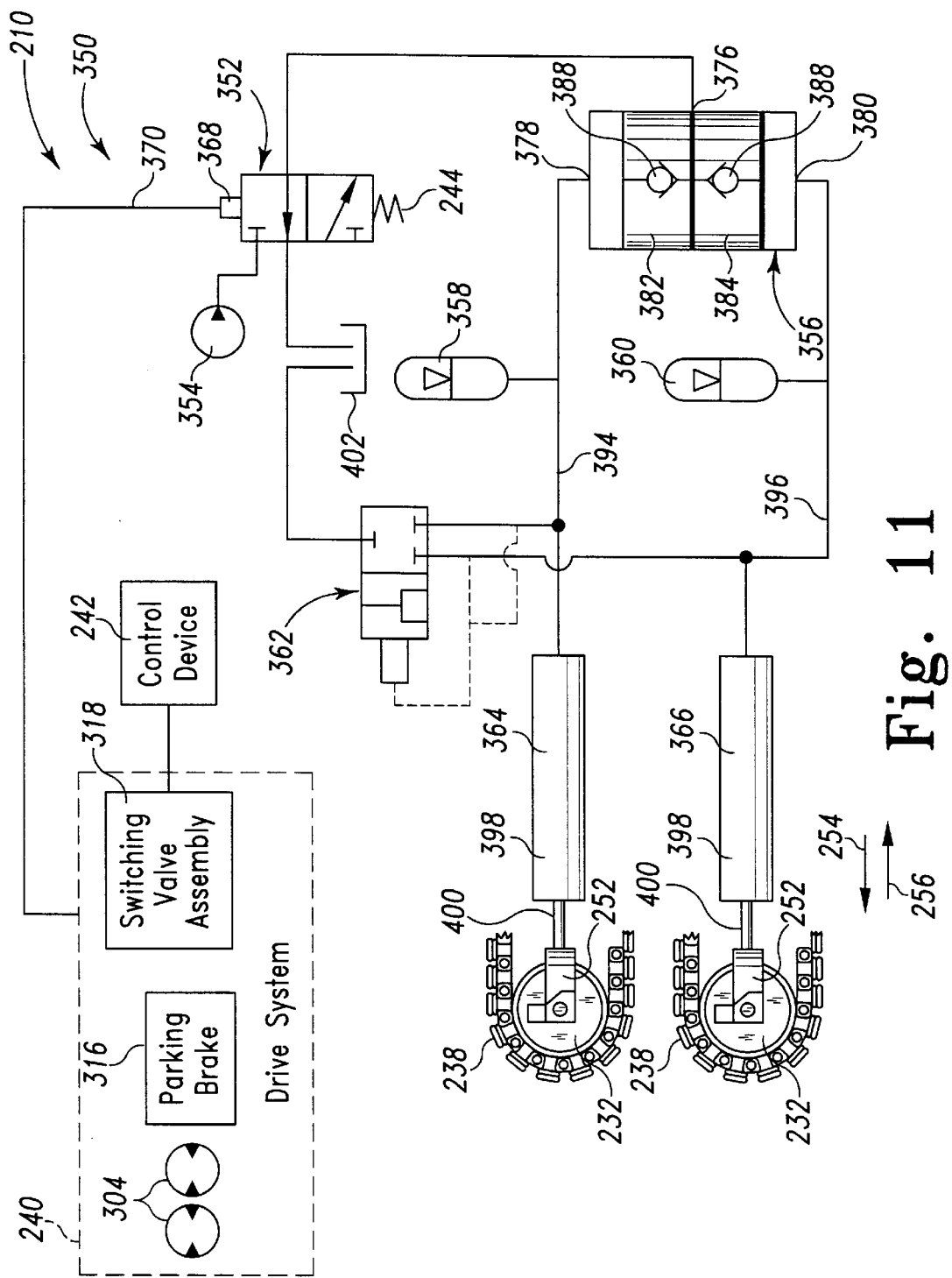
FIG. 11 is a schematic view of a second embodiment of a track tensioning assembly which incorporates the features of the present invention therein, note that in FIG. 11, the track tensioning assembly is shown positioned in its retracted position.
Figure 12:
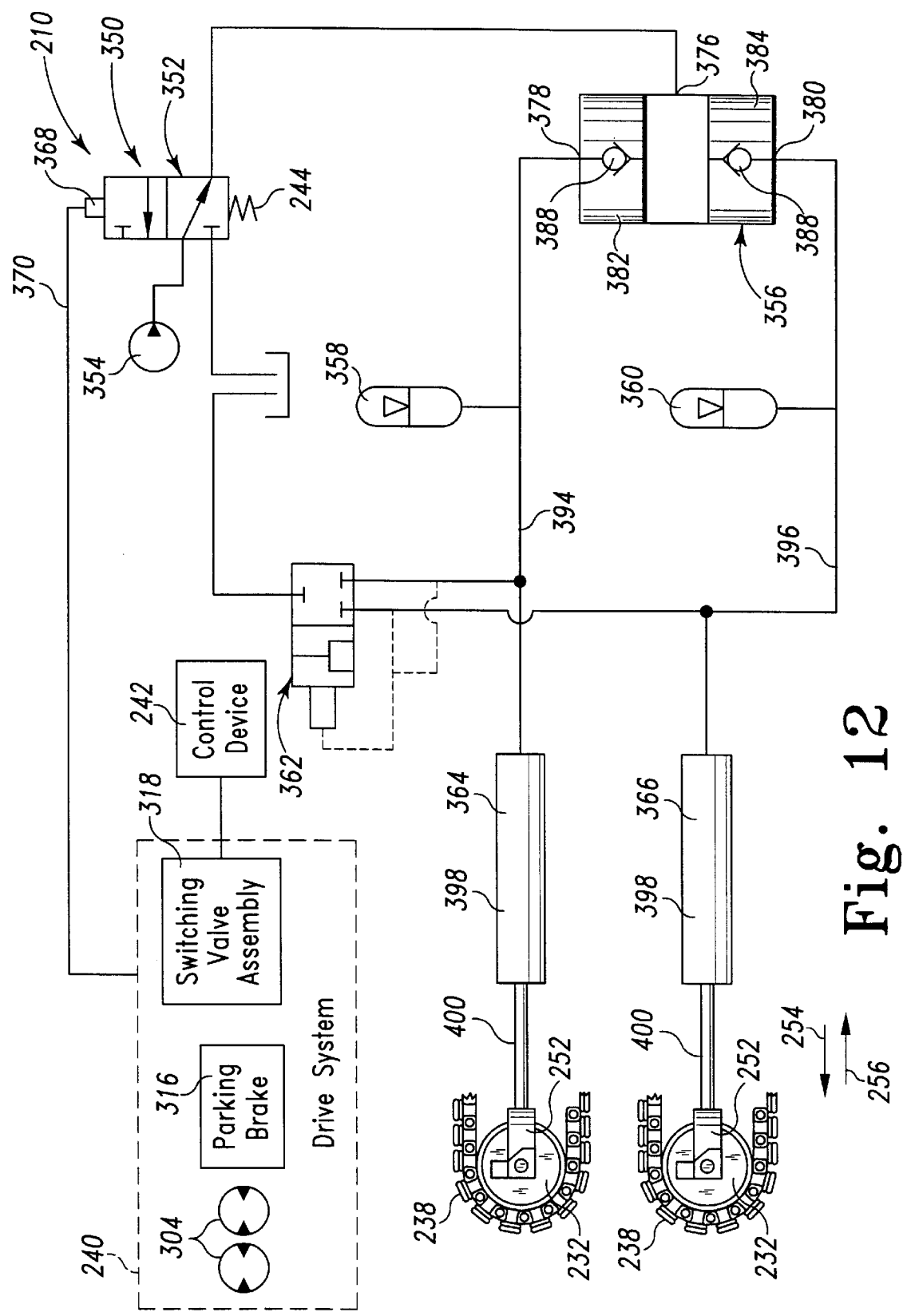
FIG. 12 is a view similar to FIG. 11, but showing the track tensioning assembly positioned in its extended position.

The track tensioning assembly 350 includes a control valve 352, a pressurized hydraulic fluid source such as a hydraulic pump 354, a slack adjuster device 356, a pair of accumulators 358, 360, and a pressure relief valve 362. As shown in FIGS. 11 and 12, the track tensioning assembly 350 is fluidly coupled to a pair of actuators such as hydraulic cylinders 364, 366 in order to control position of the front idler wheels 232 of the excavator 210. As described above, tension on the drive track chains 238 is adjusted by moving the front idler wheels 232 in a forward or backward direction. In particular, when the front idler wheels 232 are moved in a forward direction (i.e. in the general direction of arrow 254 of FIGS. 7–8 and 11–12), tension on the drive track chain 238 is increased. Conversely, when the front idler wheels 232 are moved in a rearward direction (i.e. in the general direction of arrow 256 of FIGS. 7–8 and 11–12), tension on the drive track chain 238 is decreased.

As shown in FIGS. 11 and 12, a pilot fluid port 368 of the control valve 352 is fluidly coupled to the hydraulic drive system 240 of the excavator 210 via a fluid line 370. As described above in regard to the fluid line 314 of the track tensioning assembly 248, the fluid line 370 may be fluidly coupled to any one of numerous components associated with the hydraulic drive system 240 (or the implement supply circuit) in order to communicate changes in hydraulic pressure to the pilot fluid port 368 of the control valve 352. As described above, such changes in hydraulic pressure are indicative of the hydraulic drive system 240 being switched between its actuated mode of operation in which the drive system 240 causes advancement of the excavator 210 and its deactuated mode of operation in which the drive system 240 does not advance the excavator 210. In an exemplary embodiment, the fluid line 370 is fluidly coupled to the fluid inlet line of the parking brake 316. In such a configuration, the control valve 352 is placed in an increase-tension position (as shown in FIG. 12) by a spring 244 when relatively low fluid pressure is sensed in the fluid inlet line of the parking brake 316. However, if an increase in fluid pressure is sensed in the fluid inlet line of the parking brake 316 thereby indicating that the brake 316 is being released, the bias of the spring 244 is overcome by fluid pressure in the pilot fluid port 368, and the control valve 352 is positioned in its decrease-tension position, as shown in FIG. 11.

The pump 354 may be embodied as a dedicated pump for providing pressurized hydraulic fluid to the track tensioning assembly 350 only, or alternatively, a pressurized hydraulic fluid source associated with another system of the excavator 210 may be utilized as the pump 354. For example, the pump 354 may be a pump associated with the drive system 240. Moreover, as with the track tensioning system 248, the hydraulic pressure source may be embodied as a passive device such as a fluid accumulator. In an exemplary embodiment, the pump 354 is embodied as the pilot pressure pump for providing pilot fluid pressure to the components associated with the excavator 210.

Figure 13:
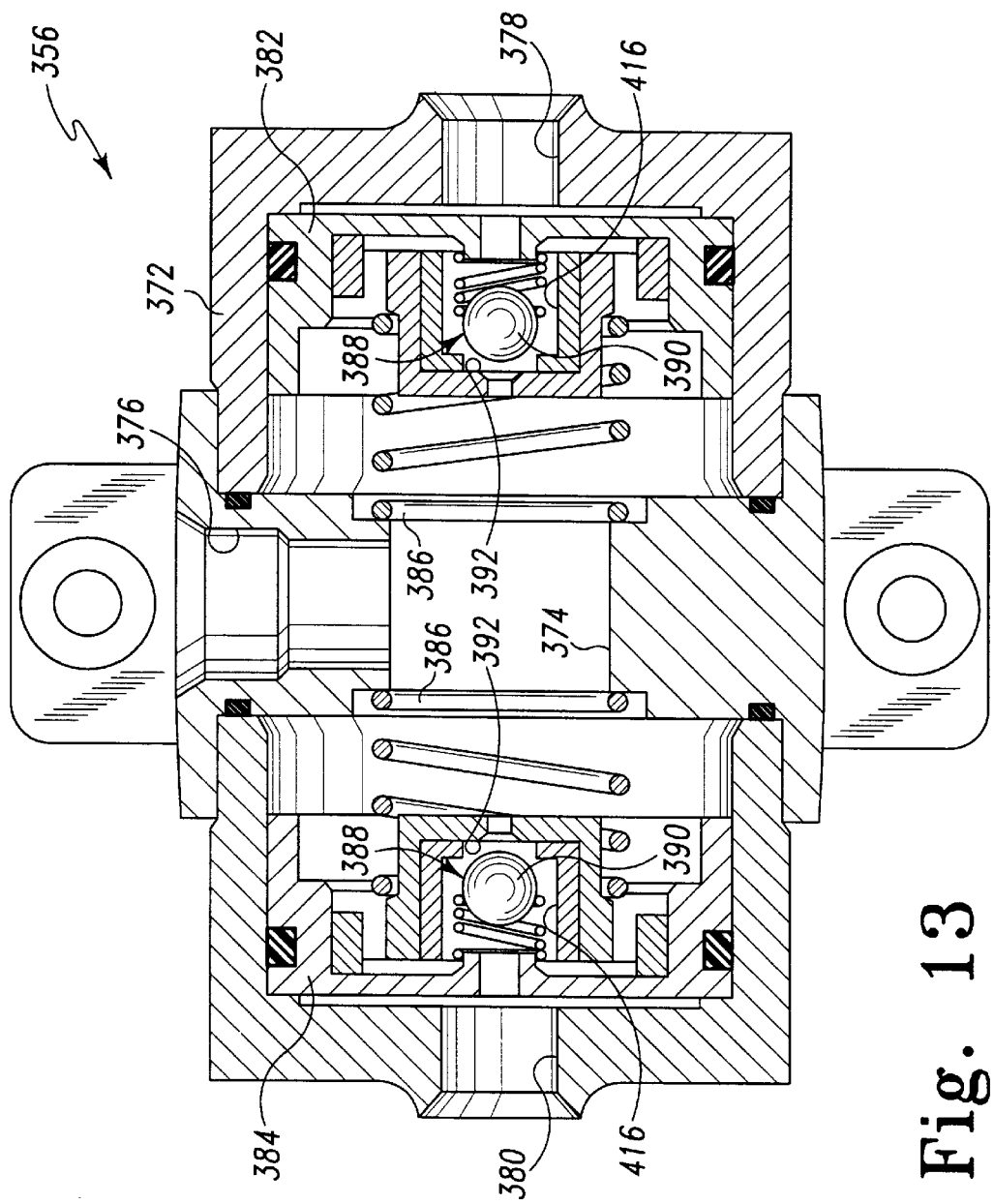
FIG. 13 is a cross sectional view of the slack adjuster device of the track tensioning assembly of FIG. 11 which shows the slack adjuster assembly positioned in its increased-tension position (note that a number of the components associated with the slack adjuster device are not shown in cross section for clarity of description)
Figure 14:
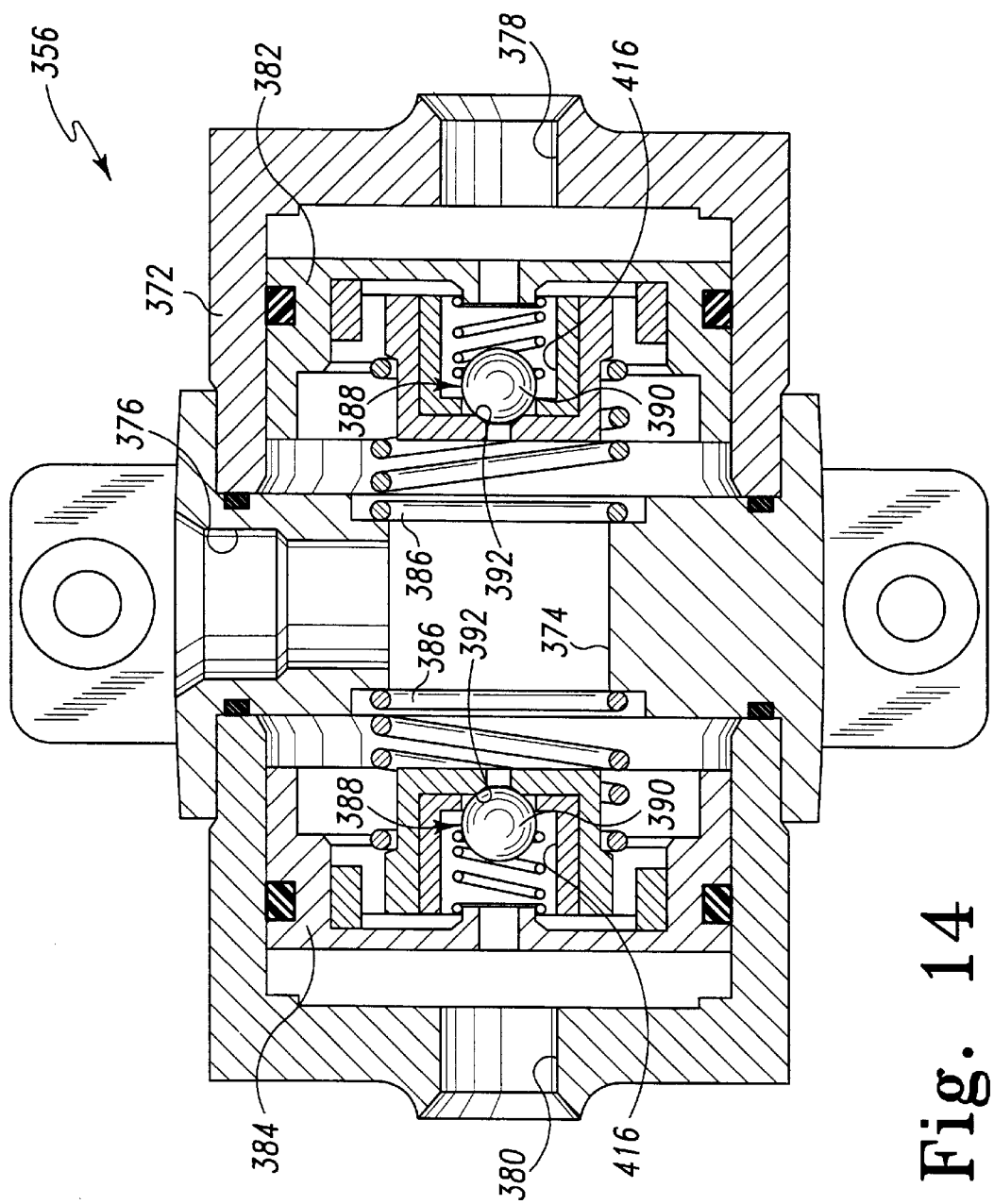
FIG. 14 is a view similar to FIG. 13 but showing the slack adjuster device positioned in its decreased-tension position.

As shown in FIGS. 13 and 14, the slack adjuster device 356 includes a housing 372 having a fluid chamber 374, a fluid inlet 376, and a pair of fluid outlets 378, 380 defined therein. A pair of pistons 382, 384 are positioned in the fluid chamber 374. The pistons 382, 384 are each positionable between an increase-tension position (as shown in FIG. 13) and a decrease-tension position (as shown in FIG. 14). In particular, the slack adjuster device 356 includes a pair of springs 386 which are coupled at a first end to the housing 372 and at a second end to the pistons 382, 384. As shown in FIG. 13, the springs 386, along with fluid pressure in the inlet 376, urge the pistons 382, 384 outwardly so as to position the pistons 382, 384 at opposite end portions of the fluid chamber 374 thereby positioning the pistons 382, 384 in their respective increase-tension positions. However, as shown in FIG. 14, when hydraulic fluid is advanced out of the fluid chamber 374 and the fluid inlet 376, fluid pressure within the fluid outlets 378, 380 overcomes the bias of the springs 386 thereby urging the pistons in 382, 384 in an inward direction thereby positioning the pistons 382, 384 in their respective decrease-tension positions within a central portion of the fluid chamber 374.

Movement of the pistons 382, 384 causes actuation of the hydraulic cylinders 364, 366. In particular, each of the pistons 382, 384 has a check valve 388 positioned within a central passage 416 defined in each of the pistons 382, 384. As shown in FIG. 14, each of the check valves 388 has a closed check position in which a ball 390 is urged into contact with the valve seat 392 thereby isolating the fluid inlet 376 from the fluid outlets 378, 380 (and hence the hydraulic cylinders 364, 366). The check valves 388 also have an open check position in which the ball 390 is urged off of the valve seat 392 so as to allow fluid to advance from the fluid inlet 376 to the fluid outlets 378, 380.

The slack adjuster device 356 may be embodied as any slack adjusting device which is capable of performing the described functions. For example, slack adjusting devices which are particularly useful as the slack adjuster device 356 of the present invention are commercially available from The BFGoodrich Company of Charlotte, N.C.

As shown in FIGS. 11 and 12, the fluid outlets 378, 380 are fluidly coupled to the hydraulic cylinders 364, 366, respectively. In particular, the fluid outlet 378 is coupled to the hydraulic cylinder 364 via a fluid line 394, whereas the fluid outlet 380 is coupled to the hydraulic cylinder 366 via a fluid line 396. The hydraulic cylinders 364, 366 each have a cylinder housing 398 having a rod 400 extending therefrom. A first end of the rods 400 is secured to a piston (not shown) within the cylinder housings 398, whereas a second end of each of the rods 400 is secured to the yokes 252 associated with the front idler wheels 232. Hence, extension of the rods 400 (i.e. movement of the rods 400 in the general direction of arrow 254 relative to the housings 398) causes corresponding movement of the idler wheels 232 thereby increasing tension on the drive track chains 238. Conversely, retraction of the rods 400 (i.e. movement of the rods 400 in the general direction of arrow 256 relative to the housings 398) causes corresponding movement of the idler wheels 232 thereby decreasing tension on the drive track chains 238.

Hence, from the above description, it should be appreciated that when the control valve 352 is positioned in its increase-tension position (as shown in FIG. 12) thereby indicating that the excavator 210 is being maintained in a stationary position in order to, for example, perform a digging function, pressurized hydraulic fluid is advanced from the pump 354 to the fluid chamber 374 of the slack adjuster device 356 via the inlet fluid port 376. Presence of fluid pressure within the fluid chamber 374 along with the bias of the springs 386 urges the pistons 382, 384 in opposite outward directions thereby positioning the pistons 382, 384 in their respective increase-tension positions at opposite end portions of the fluid chamber 374. Fluid pressure in the fluid chamber 374 also causes the check valves 388 to be positioned in their respective open check positions thereby allowing pressurized hydraulic fluid to advance from the fluid inlet 376, through the fluid chamber 374, and out the fluid outlets 378, 380 to the hydraulic cylinders 364, 366. Presence of such hydraulic fluid pressure causes extension of the rods 400 (i.e. movement of the rods 400 in the general direction of arrow 254 relative to the housings 398) thereby causing corresponding movement of the idler wheels 232 so as to increase tension on the drive track chains 238.

As described above in regard to the track tensioning assembly 248, it should be appreciated that increasing tension on the drive track chain 238 during a digging operation facilitates operation of the excavator 210. In particular, by removing substantially all of the slack from the drive track chain 238, the excavator 210 is less likely to roll back and forth within the inner portion of the drive track chain 238. Moreover, the check valves 388 within the slack adjuster device 356 create, in essence, a hydraulic lock which prevents backward flow from the hydraulic cylinders 364, 366 thereby minimizing, if not eliminating, movement of the front idler wheels 232 due to implement forces generated by the boom assembly 214 and the bucket 212 during operation thereof. This further eliminates undesirable movement of the undercarriage assembly 226 during performance of a work function.

As described above, if an increase in fluid pressure is sensed in the fluid inlet line of the parking brake 316 thereby indicating that the brake 316 is being released, such an increase in fluid pressure is communicated to the pilot fluid port 368 of the control valve 352 via the fluid line 370 thereby positioning the control valve 352 in its decrease-tension position, as shown in FIG. 11. When the control valve 352 is positioned in its decrease-tension position, hydraulic fluid within the fluid chamber 374 of the slack adjuster device 356 is exhausted or otherwise vented to a reservoir 402. Absence of fluid pressure within the fluid chamber 374 allows the fluid pressure within the fluid outlets 378, 380 to retract or otherwise urge the pistons 382, 384, respectively, inwardly so as to position the pistons 382, 384 in a central portion of the fluid chamber 374 thereby positioning the pistons 382, 384 in their respective decrease-tension positions. Absence of fluid pressure in the fluid chamber 374 also causes the check valves 388 to be positioned in their respective closed check positions thereby preventing pressurized hydraulic fluid from advancing from the hydraulic cylinders 364, 366 to the reservoir 402.

Movement of the pistons 382, 384 from their respective increase-tension positions to their respective decrease-tension positions causes retraction of the rods 400 (i.e. movement of the rods 400 in the general direction of arrow 256 relative to the housings 398) thereby causing corresponding movement of the idler wheels 232 so as to decrease tension on the drive track chains 238. The distance in which the idler wheels 232 are retracted (i.e. moved in the general direction of arrow 256 of FIGS. 7–8 and 11–12) corresponds to the stroke length of the pistons 382, 384. In an exemplary embodiment, a desirable traveling track tension level is achieved by retracting the front idler wheels 232 approximately ten millimeters from the point at which substantially all of the slack has been removed from the drive track chain 238 (i.e. the point at which the front idler wheels 232 are positioned during performance of a work function). Hence, the slack adjuster device 356 is configured such that each of the pistons 382, 384 has a stroke length which causes the front idler wheels 232 to be retracted approximately ten millimeters when the pistons 382, 384 are moved from their respective increase-tension positions to their respective decrease-tension positions.

As described above, such loosening of the drive track chain 238 prior to advancement of the excavator 210 provides numerous advantages over heretofore designed excavators. For example, by loosening or otherwise decreasing tension on the drive track chain 238 by a predetermined amount prior to advancement of the excavator 210, wear on components associated with the undercarriage assembly 226 is reduced thereby increasing the efficiency and even the useful life of the excavator 210.

Moreover, it should be appreciated that the design of the track tensioning system 350 provides a recoil function to the undercarriage assembly 226 thereby eliminating the need for a separate recoil assembly such as a spring or the like. In particular, the combination of the accumulators 358, 360 and the pressure relief valve 362 allows for movement of the front idler wheels 232 in the event that a rock or the like is ingested by the undercarriage assembly 226 during advancement of the excavator 210. In particular, if during advancement of the excavator 210, a rock or the like is ingested by the undercarriage assembly 226 thereby urging one of the idler wheels 232 rearwardly (i.e. in the general direction of arrow 256 of FIGS. 7–8 and 11–12), hydraulic fluid is advanced out of the corresponding hydraulic cylinder 364, 366 and into the corresponding accumulator 358, 360. Hydraulic fluid is prevented from flowing through the slack adjuster device 356 and to the reservoir 402 by the check valves 388. Such advancement of hydraulic fluid out of the hydraulic cylinders 364, 366 and into the fluid accumulators 358, 360, respectively, causes the idler wheels 232 to be moved in the rearward direction (i.e. in the general direction of arrow 256 of FIGS. 7–8 and 11–12) thereby providing relief or slack in the drive track chain 238. It should be appreciated that such relief in the drive track chain 238 facilitates expulsion of the rock from the undercarriage assembly 226. Once the rock has been expelled from the undercarriage assembly 226, fluid pressure from the accumulators 358, 360 is returned to the corresponding hydraulic cylinder 364, 366, thereby again urging the affected idler wheel 232 in a forward direction (i.e. in the general direction of arrow 254 of FIGS. 7–8 and 11–12) to its previous position thereby returning the drive track chain 238 to its previous tension setting.

However, if fluid pressure in the fluid lines 394, 396 increases beyond the relief setting of the pressure relief valve 362 (e.g. 6,000 psi), the relief valve 362 is urged rightwardly (as viewed in FIGS. 11 and 12) so as to be positioned in an open position thereby allowing fluid to be advanced to the reservoir 402. This provides additional relief to the components associated with the undercarriage assembly 226 thereby preventing damage thereto. Once pressure in the fluid lines 394, 396 decreases below the relief setting of the pressure relief valve (e.g. 6,000 psi), the relief valve closes thereby preventing additional fluid from being advanced to the reservoir 402. It should be appreciated that fluid lost during opening of the relief valve 362 may be replaced by the accumulators 358, 360. Moreover, the slack adjuster device 356 may be cycled in order to provide additional fluid, if necessary.

Hence, as described herein, the track tensioning assembly 350 provides numerous advantages over heretofore designed track tensioning assemblies. For example, by automatically switching between a relatively taut track configuration and a loosened track configuration, the excavator 210 is prevented from rolling back and forth during a digging operation, but yet also gains the benefit of decreased undercarriage component wear. Moreover, by incorporating a recoil function therein, the track tensioning assembly 350 eliminates the need for a separate recoil device thereby lowering costs associated with the design of the excavator 210.

Figure 15:
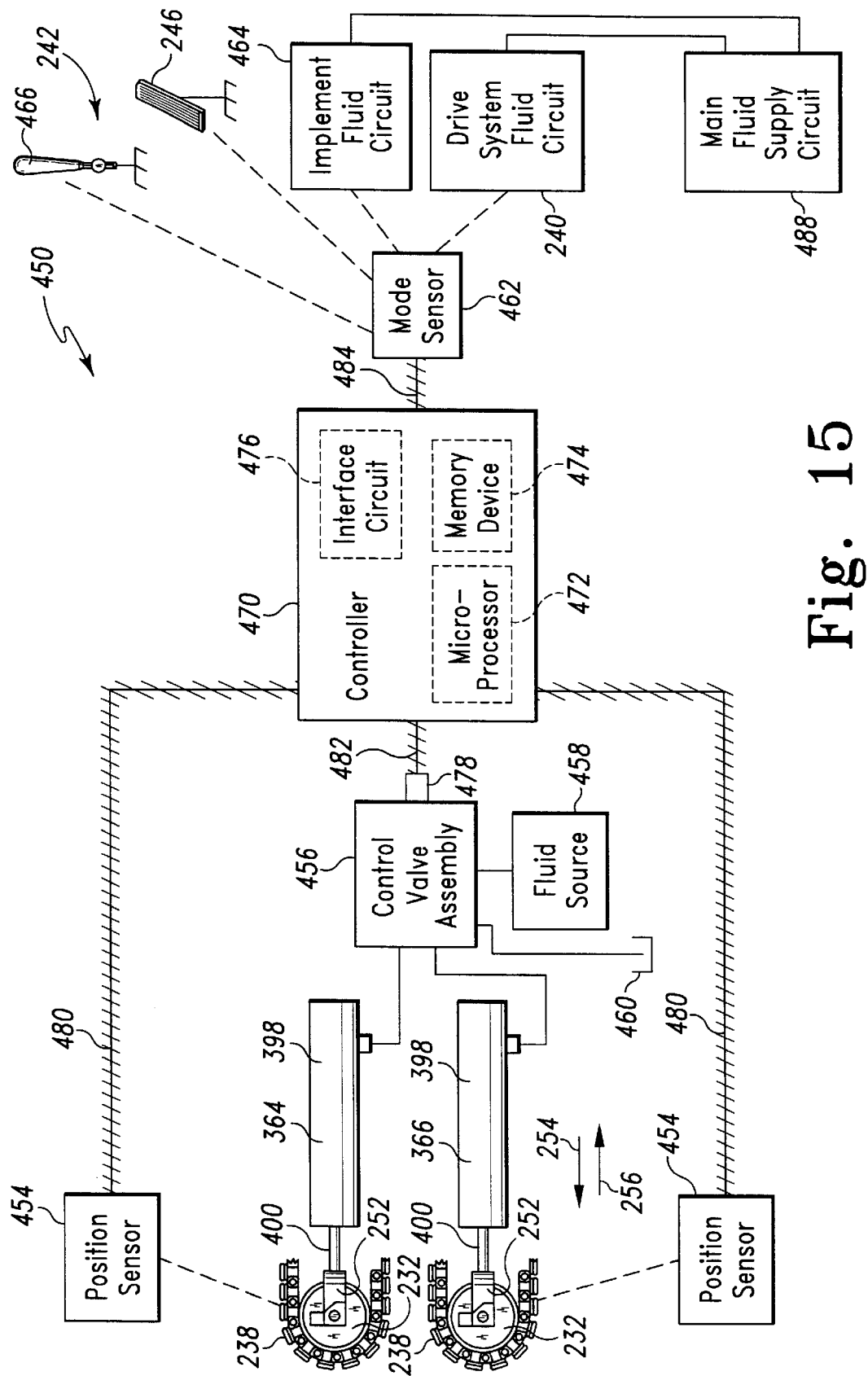
FIG. 15 is a schematic view of a third embodiment of a track tensioning assembly which incorporates the features of the present invention therein.

Referring now to FIG. 15, there is shown a third embodiment of a track tensioning assembly 450 which may be utilized in conjunction with the excavator 210. As shall be discussed below in greater detail, the track tensioning assembly 450 performs similar functions as the track tensioning assemblies 248 and 350. In particular, the track tensioning assembly 450 is configured to provide a relatively taut track configuration in order to prevent the excavator 210 from rolling back and forth during a digging operation, but then loosen the tension on the drive track chain 238 during advancement of the excavator 210 in order to decrease undercarriage component wear. Moreover, the track tensioning assembly 450 also provides a recoil function thereby eliminating the need to provide separate recoil components.

The track tensioning assembly 450 utilizes similar concepts as those which were described above in regard to operation of the track tensioning control system 158 of the track-type tractor 10. Moreover, the track tensioning assembly 450 utilizes a number of components which are utilized in the track tensioning assembly 350. The same reference numerals are utilized to designate components which are common between the track tensioning assemblies 350, 450.

The track tensioning assembly 450 includes a number of position sensors 454 which are positioned in order to monitor the position of a number of undercarriage components relative to one another. In particular, the position sensors 454 are provided to sense the position of the front idler wheels 232. As shall be discussed below in greater detail, the position of the front idler wheels 232 may be utilized to provide "closed loop" control of the tension on the drive track chain 238.

The position sensors 454 may be provided as any type of sensor which is capable of sensing the position of the front idler wheels 232. For example, the position sensors 454 may be embodied as known sensors for detecting the position of the rods 400 relative to the housings 398. It should be appreciated that the position of the idler wheels 232 may be ascertained from the position of the rods 400 relative to the housings 398. Moreover, in an exemplary embodiment, the position sensors 454 are provided as linear displacement transducers which senses the linear distance between a sensing location associated with the front idler wheel 232 and a sensing location associated with another undercarriage component such as the frame assembly 228. As with the position sensor 154, one commercially available sensor which is particularly useful as the sensor 454 of the present invention is a Series BTL-2 Linear Displacement Transducer which is commercially available Balluff, Incorporated.

As shown in FIG. 15, the track tensioning assembly 450 also includes an electrically-actuated control valve assembly 456. The control valve assembly 456 controls actuation of the hydraulic cylinders 364, 366 in order to increase or decrease tension on the drive track chain 238. More specifically, tension on the drive track chains 238 is adjusted by moving the front idler wheels 232 in a forward or backward direction. For example, when the front idler wheels 232 are moved in a forward direction (i.e. in the general direction of arrow 254 of FIGS. 7–8 and 15), tension on the drive track chain 238 is increased. Conversely, when the front idler wheels 232 are moved in a rearward direction (i.e. in the general direction of arrow 256 of FIGS. 7–8 and 15), tension on the drive track chain 238 is decreased. Hence, the control valve assembly 456 may be operated to fluidly couple the hydraulic cylinders 364, 366 to a pressurized hydraulic fluid source 458 so as to increase fluid pressure communicated to the hydraulic cylinders 364, 366 thereby increasing tension on the drive track chain 238, or may alternatively may be operated to fluidly couple the hydraulic cylinders 364, 366 to a reservoir 460 so as to decrease fluid pressure in the hydraulic cylinders 364, 366 thereby decreasing tension on the drive track chain 238.

The track tensioning assembly 450 also includes a number of mode sensors 462 for sensing the mode of operation in which the excavator 210 is being operated. In particular, the mode sensors 462 are provided to determine if the operator is operating the excavator 210 in either its travel mode of operation in which the hydraulic excavator 210 is being advanced from one location to another or its work mode of operation in which the hydraulic excavator 210 is operated to perform a work function such as a digging operation. As described below, the mode sensors 462 may be provided as any one of a number of different sensors.

For example, the mode sensor 462 may be provided as a pressure sensor for sensing a change in hydraulic fluid pressure within the hydraulic drive circuit of the drive system 240. In such a configuration, the mode sensor 462 is utilized to determine that the excavator 210 is being operated in its travel mode of operation when fluid pressure within the drive system 240 is relatively high (e.g. above a predetermined pressure threshold). Conversely, the mode sensor 462 may also be utilized to determine that the excavator 210 is being operated in its work mode of operation when fluid pressure within the drive system 240 is relatively low (since the excavator 210 is not advanced during performance of a work function).

The mode sensor 462 may also be provided as a pressure sensor for sensing a change in hydraulic fluid pressure within the implement fluid supply circuit 464. It should be appreciated that the implement fluid supply circuit 464 includes the components necessary to supply pressurized hydraulic fluid to the work implements associated with the excavator 210 such as the boom assembly 214 and the bucket 212. In such a configuration, the mode sensor 462 is utilized to determine that the excavator 210 is being operated in its work mode of operation when fluid pressure within the implement fluid supply system 464 is relatively high (e.g. above a predetermined pressure threshold).

The mode sensor 462 may also be embodied as a position sensor for sensing position of one or more of the control devices 242 located in the cab 240. For example, the mode sensor 462 may be provided as a position sensor for sensing position of the foot pedal assembly 246 which is utilized by the operator to advance the excavator 210. In such a configuration, the mode sensor 462 is utilized to determine that the excavator 210 is being operated in its travel mode of operation when the foot pedal assembly 246 is positioned in a first position such as a depressed pedal position. Conversely, the mode sensor 462 may also be utilized to determine that the excavator 210 is being operated in its work mode of operation when the foot pedal assembly 246 is positioned in a second position such as a released pedal position (since the excavator 210 is not advanced during performance of a work function).

Moreover, the mode sensor 462 may also be embodied as a position sensor for sensing position of other control devices 242 located in the cab 240. For example, the mode sensor 462 may be provided as a position sensor for sensing position of an implement control lever 466 which is utilized by the operator to operate the implements associated with the excavator 210 such as the boom assembly 214 and the bucket 212. In such a configuration, the mode sensor 462 is utilized to determine that the excavator 210 is being operated in its work mode of operation when the control lever 466 is positioned in a first position such as a forward or backward lever position. Conversely, the mode sensor 462 may also be utilized to determine that the excavator 210 is being operated in its travel mode of operation when the control lever 466 is positioned in a second position such as a neutral lever position (since the implements associated with the excavator 210 are not operated during advancement of the excavator 210).

It should be appreciated that the above-described embodiments of the mode sensor 462 are meant to be exemplary in nature, and that numerous other embodiments of the mode sensor 462 may be utilized to determine whether the excavator 210 is being operated in its travel mode of operation or its work mode of operation. Accordingly, while the particular embodiments of the mode sensor 462 described herein provide significant advantages to the present invention, certain of such advantages may be realized by utilization of numerous other embodiments of the mode sensor 462 other than those described herein.

As shown in FIG. 15, the control valve assembly 456, the position sensors 454, and the mode sensor 462 are each electrically coupled to a processing unit such as a controller 470. The controller 470 may be a dedicated controller for controlling the components shown in FIG. 15, or may alternatively be integrated into another controller associated with the excavator 210 such as the engine controller (not shown), transmission controller (not shown), or implement controller (not shown).

The controller 470 is essentially the same as the controller 160 which was described above in regard to the track tensioning control system 158 of the track-type tractor 10. In particular, the controller 470 includes electrical components commonly found in other work machine controllers such as a microprocessor 472, a memory device 474, and an interface circuit 476. The interface circuit 476 converts the output signals from the position sensors 454 and the mode sensor 462 into a signal which is suitable for presentation to an input of the microprocessor 472. In particular, an analog-to-digital (A/D) converter (not shown) associated with the interface circuit 476 converts the analog voltage or other type of output signal generated by the position sensors 454 and the mode sensor 462 into a digital value for use by the microprocessor 472. It should be appreciated that the magnitude of the analog voltage generated by the position sensor 454 is indicative of the position of the front idler wheels 232, whereas the magnitude of the analog voltage (or other characteristic of the signal) generated by the mode sensor 462 is indicative of the mode of operation of the excavator 210.

The interface circuit 476 also converts output signals generated by the microprocessor 472 into a signal which is suitable for use by a solenoid 478 associated with the control valve assembly 456. In particular, the interface circuit 476 converts the output signals from the microprocessor 472 into an analog actuation pulse which actuates the solenoid 478 thereby positioning the control valve assembly 456 into one of its actuated positions in order to cause extension or retraction of the hydraulic cylinders 364, 366 as described above. It should be further appreciated that the interface circuit 476 may be embodied as a discrete device or number of devices, or may be integrated into the microprocessor 472.

The memory device 474 is provided to store the code or set of instructions which are executed by the controller 470 during operation of the track tensioning system 450. Moreover, operation parameters may also be stored in the memory device 474. The memory device may be embodied as any known memory device such as RAM and/or ROM devices.

As shown in FIG. 15, the position sensors 454 are electrically coupled to the controller 470 via a pair of signal lines 480. Hence, output signals generated by the position sensors 480 are communicated to the controller 470 via the signal lines 480. As discussed above, such output signals may be generated and thereafter communicated by the position sensors 454 in numerous forms. For example, the position sensors 454 may generate output signals in the form of an analog DC voltage or in the form of a signal utilizing current-to-pulse signal timing.

The control valve assembly 456 is also electrically coupled to the controller 470. In particular, the solenoid 478 of the control valve assembly 456 is electrically coupled to the controller 470 via a signal line 482. Hence, the controller 470 generates output signals in the form of actuation pulses on the signal line 482 which actuate the solenoid 478 thereby positioning the control valve assembly 456 into a number of valve positions which, as described above, selectively extend or retract the rods 400 relative to the cylinder housings 398 of the hydraulic cylinders 364, 366 thereby selectively increasing or decreasing tension on the drive track chain 238.

The mode sensor 462 is also electrically coupled to the controller 470 via a signal line 484. As described above, the mode sensor 462 is provided to sense or otherwise determine whether the excavator 210 is being operated in either its drive mode of operation in which the excavator 210 is being advanced from one location to another, or its work mode of operation in which the excavator 210 is utilized to perform a work function such as a digging function. Hence, the mode sensor 462 generates output signals on the signal line 484 which are indicative of the mode of operation of the excavator 210.

The controller 470 communicates with the position sensors 454, the control valve assembly 456, and the mode sensor 462 in order to maintain a desired level of tension on the drive track chain 238. In particular, the controller 470 initially executes a "zeroing" routine in which the controller 470 causes all of the slack to be removed from the drive track chain 238. In order to accomplish this, the controller 470 generates an output signal on the signal line 482 so as to actuate the solenoid 478 of the control valve assembly 456 thereby causing pressurized hydraulic fluid to be advanced to the hydraulic cylinders 364, 366 from the fluid source 458. The presence of pressurized hydraulic fluid at the head end of the hydraulic cylinders 364, 366 causes the rods 400 of the cylinders 364, 366 to be extended or otherwise moved in the forward direction (i.e. in the general direction of arrow 254 of FIGS. 7–8 and 15). Such forward movement of the rods 400 likewise urges the front idler wheels 232 in the forward direction (i.e. in the general direction of arrow 254 of FIGS. 7–8 and 15) thereby increasing tension on the drive track chain 238. It should be appreciated that the above-described procedure continues until substantially all of the slack has been removed from the drive track chain 238. It should be appreciated that numerous techniques may be utilized to determine when substantially all of the slack has been removed from the drive track chain 238. For example, visual inspection of the drive track chain 238 may be performed in order to determine when the track chain 238 is taut or otherwise has substantially all of the slack removed therefrom. Moreover, a pressure sensor may be utilized to determine when fluid pressure within the hydraulic cylinders 364, 366 increases to a pressure level indicative of substantially all of the slack having been removed from the drive track chain 238. In addition, the position sensors 454 may be utilized to determine if subsequent additions of hydraulic fluid into the hydraulic cylinders 364, 366 are unable to further extend the rods 400 (i.e. unable to further move the front idler wheels 232) thereby indicating that substantially all of the slack has been removed from the drive track chain 238.

In any event, once the controller 470 has established a "zero position" (i.e. substantially all of the slack has been removed from the drive track chain 238), a predetermined amount of hydraulic fluid is then removed from the hydraulic cylinders 364, 366 in order to retract or otherwise move the rods 400 in a rearward direction (i.e. in the general direction of arrow 256 of FIGS. 7–8 and 15) by a predetermined distance. In particular, the controller 470 generates an output signal on the signal line 482 so as to actuate the solenoid 478 of the control valve assembly 456 thereby causing pressurized hydraulic fluid to be drained from the hydraulic cylinders 364, 366 to the reservoir 460. The removal of pressurized hydraulic fluid from the head end of the hydraulic cylinders 364, 366 causes movement of the rods 400 of the cylinders 364, 366 in the rearward direction (i.e. in the general direction of arrow 256 of FIGS. 7–8 and 15). Such rearward movement of the rods 400 likewise urges the front idler wheels 232 in the rearward direction (i.e. in the general direction of arrow 256 of FIGS. 7–8 and 15) thereby decreasing tension on the drive track chain 238. Once the position sensors 454 detect that the respective front idler wheels 232 have been moved rearwardly the predetermined distance, the controller 470 ceases to generate output signals on the signal line 482 thereby ceasing retraction of the rods 400 of the hydraulic cylinders so as to position the front idler wheels 232 in a "traveling position". It should be appreciated that retraction of the rods 400 of the hydraulic cylinders 364, 366 by the predetermined distance creates a corresponding predetermined amount of slack in the drive track chain 238.

Thereafter, the position sensors 454 are utilized to maintain the front idler wheels 232 in the traveling position during advancement of the excavator 210. In particular, if the position sensors 454 detect that the position of the one of the front idler wheels 232 changes in a manner which is indicative that tension on the drive track chain 238 has decreased, the controller 470 controls operation of the control valve assembly 456 so as to increase fluid pressure in the head end of the corresponding hydraulic cylinder 364, 366 in the manner described above so as to move the affected front idler wheel 232 in the forward direction (i.e. in the general direction of arrow 254 of FIGS. 7–8 and 15) so as to incrementally increase tension on the drive track chain 238. Once the affected front idler wheel 232 has been advanced back to its traveling position (as sensed by the appropriate position sensor 454), the controller 470 ceases to increase fluid pressure in the head end of the corresponding hydraulic cylinder 364, 366 thereby ceasing forward advancement of the rod 400 and hence the front idler wheel 232.

Conversely, if the position sensors 454 detect that the position of the one of the front idler wheels 232 changes in a manner which is indicative that tension on the drive track chain has increased, the controller 470 controls operation of the control valve assembly 456 so as to decrease fluid pressure in the head end of the corresponding hydraulic cylinder 364, 366 in the manner described above so as to move the affected front idler wheel 232 in the rearward direction (i.e. in the general direction of arrow 256 of FIGS. 7–8 and 15) so as to incrementally decrease tension on the drive track chain 238. Once the affected front idler wheel 232 has been advanced back to its traveling position (as sensed by the appropriate position sensor 454), the controller 470 ceases to decrease fluid pressure in the head end of the corresponding hydraulic cylinder 364, 366 thereby ceasing rearward advancement of the rod 400 and hence the front idler wheel 232.

It should be appreciated that such "closed loop" control of the tension on the drive track chain 238 prevents the excavator 210 from being advanced for a period of time with an undesirable amount of tension (either too high or too low) in the drive track chain 238 thereby increasing the efficiency of the excavator 210 while also increasing the useful life of the components associated with the undercarriage assembly 226. Moreover, it should be appreciated that the controller 470 may also be configured to automatically re-execute the "zeroing" procedure at predetermined intervals so as to account for normal wear in the components associated with the drive track chain 238.

Moreover, it should be appreciated that a pressure relief valve (not shown) may be fluidly interposed between the control valve assembly 456 and the hydraulic cylinders 364, 366 in order to provide a recoil function to the undercarriage assembly 226. In particular, if a rock or the like is ingested by the undercarriage assembly 226 during advancement of the excavator 210, one of the front idler wheels 232 is urged or otherwise moved rearwardly (i.e. in the general direction of arrow 256 of FIGS. 7–8 and 15) thereby increasing fluid pressure in the supply lines from the control valve assembly 456 to the hydraulic cylinders 364, 366. Once fluid pressure within the supply lines is greater in magnitude than the relief setting of the pressure relief valve (e.g. 6,000 psi), hydraulic fluid within the supply lines and the affected hydraulic cylinder 364, 366 is exhausted to the reservoir 460 via the pressure relief valve thereby allowing the rod 400 (and hence the corresponding front idler wheel 232) to be urged or otherwise moved in the rearward direction (i.e. in the general direction of arrow 256 of FIGS. 7–8 and 15) thereby providing relief or slack in the affected drive track chain 238. It should be appreciated that such relief in the drive track chain 238 facilitates expulsion of the rock from the undercarriage assembly 226.

Once the rock has been expelled from the undercarriage assembly 226, the front idler wheel 232 is returned to its previous traveling position thereby returning the drive track chain 238 to its previous tension level. In particular, the controller 470 controls actuation of the control valve assembly 456 based on output from the position sensors 454 in order to return the front idler wheel 232 to its previous traveling position thereby returning the drive track chain 238 to its previous tension level. It should be appreciated that the controller 470 may alternatively be configured to execute the "zeroing procedure" so as to reset the traveling position of the front idler wheel 232 after each recoil event.

It should also be appreciated that the configuration of the track tensioning assembly 450 allows for operation of the excavator 210 in a similar manner as the track tensioning assemblies 248 and 350. In particular, the track tensioning assembly 450 is configured to provide a relatively taut track configuration in order to prevent the excavator 210 from rolling back and forth during a digging operation, but then loosen the tension on the drive track chain 238 to a predetermined tension level during advancement of the excavator 210 in order to decrease undercarriage component wear.

In order to provide such functionality, the controller 470 monitors output from the mode sensor 462. As described above, output from the mode sensor 462 is indicative of whether the excavator 210 is being operated in its work mode of operation in which the excavator 210 is utilized to perform a work function, or its travel mode of operation in which the excavator 210 is advanced from one location to another.

If output from the mode sensor 462 indicates that the excavator 210 is being operated in its work mode of operation, the controller 470 generates an implement-active control which causes substantially all of the slack to be removed from the drive track chain 238. In order to accomplish this, the controller 470 generates an increase-tension control signal on the signal line 482 so as to actuate the solenoid 478 of the control valve assembly 456 thereby causing pressurized hydraulic fluid to be advanced to the hydraulic cylinders 364, 366 from the fluid source 458. The presence of pressurized hydraulic fluid at the head end of the hydraulic cylinders 364, 366 causes the rods 400 of the cylinders 364, 366 to be extended or otherwise moved in the forward direction (i.e. in the general direction of arrow 254 of FIGS. 7–8 and 15). Such forward movement of the rods 400 likewise urges the front idler wheels 232 in the forward direction (i.e. in the general direction of arrow 254 of FIGS. 7–8 and 15) thereby increasing tension on the drive track chain 238. It should be appreciated that the above-described procedure continues until substantially all of the slack has been removed from the drive track chain 238. As described above, numerous techniques may be utilized to determine when substantially all of the slack has been removed from the drive track chain 238. For example, visual inspection of the drive track chain 238 may be performed in order to determine when the track chain 238 is taut or otherwise has substantially all of the slack removed therefrom. Moreover, a pressure sensor may be utilized to determine when fluid pressure within the hydraulic cylinders 364, 366 increases to a pressure level indicative of substantially all of the slack having been removed from the drive track chain 238. In addition, the position sensors 454 may be utilized to determine if subsequent additions of hydraulic fluid into the hydraulic cylinders 364, 366 are unable to further extend the rods 400 (i.e. unable to further move the front idler wheels 232) thereby indicating that substantially all of the slack has been removed from the drive track chain 238.

Once substantially all of the slack has been removed from the drive track chain 238, a track-taut control signal is generated and the excavator 210 may be operated to perform a work function such as a digging operation. In particular, hydraulic pressure from the implement fluid supply circuit 464 is selectively directed to the components associated with the implement assembly of the excavator 210 such as the boom assembly 214 and the bucket 212 in order to perform the work function.

Thereafter, if the mode sensor 462 subsequently detects that the excavator 210 is being operated in its drive mode of operation, the controller 470 generates a machine-advancement control signal which causes a predetermined amount of slack to be introduced into the drive track chain 238. In order to accomplish this, the controller 470 causes hydraulic fluid to be removed from the head end of the hydraulic cylinders 364, 366 in order to retract or otherwise move the rods 400 in a rearward direction (i.e. in the general direction of arrow 256 of FIGS. 7–8 and 15) by a predetermined distance. In particular, the controller 470 generates a decrease-tension control signal on the signal line 482 so as to actuate the solenoid 478 of the control valve assembly 456 thereby causing pressurized hydraulic fluid to be drained from the hydraulic cylinders 364, 366 to the reservoir 460. The removal of pressurized hydraulic fluid from the head end of the hydraulic cylinders 364, 366 causes movement of the rods 400 of the cylinders 364, 366 in the rearward direction (i.e. in the general direction of arrow 256 of FIGS. 7–8 and 15). Such rearward movement of the rods 400 likewise urges the front idler wheels 232 in the rearward direction (i.e. in the general direction of arrow 256 of FIGS. 7–8 and 15) thereby decreasing tension on the drive track chain 238. Once the position sensors 454 detect that the respective front idler wheels 232 have been moved rearwardly by the predetermined distance, the controller 470 ceases to generate output signals on the signal line 482 thereby ceasing retraction of the rods 400 of the hydraulic cylinders 364, 366 so as to position the front idler wheels 232 in their respective traveling positions. It should be appreciated that retraction of the rods 400 of the hydraulic cylinders 364, 366 by the predetermined distance creates a corresponding predetermined amount of slack in the drive track chain 238. Once the front idler wheels 232 have been positioned in their respective traveling positions, a tension-reduced control signal is generated and the hydraulic components associated with the drive system 240 may be utilized to advance the excavator 210 in the desired direction. During such advancement of the excavator 210, the controller 470 monitors output from the position sensors 454 in order to maintain the front idler wheels 232 in their respective traveling positions in the manner previously discussed.

Hence, as described herein, the track tensioning assembly 450 provides numerous advantages over heretofore designed track tensioning assemblies. For example, by automatically switching between a relatively taut track configuration and a loosened track configuration, the excavator 210 is prevented from rolling back and forth during a digging operation, but yet also gains the benefit of decreased undercarriage component wear during advancement of the excavator 210. Moreover, by incorporating a recoil function therein, the track tensioning assembly 450 eliminates the need for a separate recoil device thereby lowering costs associated with the design of the excavator 210.

INDUSTRIAL APPLICABILITY

In particular regard to operation of the track-type tractor 10, the controller 160 of the track tensioning control system 158 communicates with the position sensor 154, the master valve assembly 90, the inlet control valve 142, and the outlet control valve 144 in order to maintain a desired level of tension on the drive track chain 28. In particular, the controller 160 initially executes a "zeroing" routine in which the controller 160 causes substantially all of the slack to be removed from the drive track chain 28 in the manner described above. Once the controller 160 has established a "zero position" (i.e. substantially all of the slack has been removed from the drive track chain 28), a predetermined amount of hydraulic fluid is then removed from the fluid chamber 54 in order to retract or otherwise move the piston 48 in a rearward direction (i.e. in the general direction of arrow 44 of FIGS. 2 and 4) by a predetermined distance so as to position the front frame member 32 (and hence the front idler wheel 22) in a "target position". It should be appreciated that retraction of the piston 48 by the predetermined distance creates a corresponding predetermined amount of slack in the drive track chain 28.

Thereafter, the position sensor 154 is utilized to maintain the front frame member 32 (and hence the front idler wheel 22) in the target position. In particular, if the position sensor 154 detects that the linear distance D from the front frame member 32 to the rear frame member 34 decreases thereby indicating that tension on the drive track chain has decreased, the controller 160 controls operation of the master valve assembly 90 and the inlet control valve 142 so as to increase fluid pressure in the fluid chamber 54 of the actuator 48 in the manner described above so as to move the front frame member 32 in the forward direction (i.e. in the general direction of arrow 42 of FIGS. 2 and 4) so as to incrementally increase tension on the drive track chain 28. Once the front frame member 32 has been advanced back to the target position (as sensed by the position sensor 154), the controller 160 ceases to increase fluid pressure in the fluid chamber 54 thereby ceasing forward advancement of the piston 48.

Conversely, if the position sensor 154 detects that the linear distance D from the front frame member 32 to the rear frame member 34 increases thereby indicating that tension on the drive track chain has increased, the controller 160 controls operation of the master valve assembly 90 and the outlet control valve 144 so as to incrementally decrease fluid pressure in the fluid chamber 54 of the actuator 48 in the manner described above so as to move the front frame member 32 in the rearward direction (i.e. in the general direction of arrow 44 of FIGS. 2 and 4) so as to decrease tension on the drive track chain 28. Once the front frame member 32 has been advanced back to the target position (as sensed by the position sensor 154), the controller 160 ceases to decrease fluid pressure in the fluid chamber 54 thereby ceasing rearward advancement of the piston 48.

As described in detail above, such "closed loop" control of the tension on the drive track chain 28 prevents the track-type tractor 10 from being operated for a period of time with an undesirable amount of tension (either too high or too low) in the drive track chain 28 thereby increasing the efficiency of the track-type tractor 10 while also increasing the useful life of the components associated with the undercarriage assembly 16. Moreover, it should be appreciated that the controller 160 may also be configured to automatically re-execute the "zeroing" procedure at predetermined intervals so as to account for normal wear in the components associated with the drive track chain 28.

Moreover, as described in detail above, the use of a pressure relief valve (not shown) which is fluidly interposed between the fluid port 138 of the valve group 58 and the fluid port 140 of the actuator 46 provides a recoil function to the undercarriage assembly 16. In particular, if a rock or the like is ingested by the undercarriage assembly 16 during advancement of the track-type tractor 10, the front idler wheel 22 is urged or otherwise moved rearwardly (i.e. in the general direction of arrow 44 of FIGS. 2 and 4) thereby increasing fluid pressure in the fluid chamber 54 of the actuator 46. Once fluid pressure within the fluid chamber 54 is greater in magnitude than the relief setting of the pressure relief valve (e.g. 6,000 psi), hydraulic fluid within the fluid chamber 54 is exhausted to the reservoir 72 via the pressure relief valve thereby allowing the piston 48 (and hence the front frame member 32 and the front idler wheel 22) to be urged or otherwise moved in the rearward direction (i.e. in the general direction of arrow 44 of FIGS. 2 and 4) thereby providing relief or slack in the drive track chain 28. It should be appreciated that such relief in the drive track chain 28 facilitates expulsion of the rock from the undercarriage assembly 16.

Once the rock has been expelled from the undercarriage assembly 16, the front frame member 32 is returned to its previous target position thereby returning the drive track chain 28 to its previous tension level. In particular, the controller 160 controls actuation of the valves 90, 142, and 144 based on output from the position sensor 154 in order to return the front frame member 32 (and hence the front idler wheel 22) to its previous target position thereby returning the drive track chain 28 to its previous tension level.

In regard to operation of the hydraulic excavator 210 equipped with the track tensioning assembly 248, actuation or deactuation of the hydraulic drive system 240 may be monitored in order to determine the mode of operation in which the excavator 210 is being operated. In particular, fluid pressure communicated from the hydraulic drive system 240 may be utilized to determine if the excavator 210 is being operated in a work mode of operation in which the excavator 210 is utilized to perform a work function such as a digging function, or a travel mode of operation in which the excavator 210 is advanced from one location to another. When the excavator 210 is being operated in its work mode of operation, the control valve assembly 288 is positioned in its increase-tension position, as shown in FIG. 10. When the control valve assembly 288 is positioned in its increase-tension position, the master piston 276 is urged leftwardly (as viewed in FIGS. 9 and 10) in the manner described above so as to increase fluid pressure in the main chamber 260. Such an increase in fluid pressure in the main chamber 260 urges the head end portion 282 of the slave piston 280 in the forward direction (i.e. in the general direction of arrow 254 of FIGS. 8–10) thereby likewise moving the front idler wheel 232 in the forward direction until substantially all of the slack is removed from the drive track chain 238 (i.e. the track is taut). It should be appreciated that such an increase in tension on the drive track chain 238 during a digging operation facilitates operation of the excavator 210 by rendering the excavator 210 less likely to roll back and forth within the inner portion of the drive track chain 238.

If an increase in fluid pressure is sensed in the fluid line 314, thereby indicating that the excavator 210 is being operated in its travel mode of operation, the control valve assembly 288 is positioned in its decrease-tension position, as shown in FIG. 9. When the control valve assembly 288 is positioned in its decrease-tension position, hydraulic fluid within the master chamber 272 is exhausted or otherwise vented to the reservoir 308 thereby decreasing fluid pressure in the main chamber 260. Such a decrease in fluid pressure in the main chamber 260 causes movement of the master piston 276 in a rightwardly direction (as viewed in FIGS. 9 and 10) until movement of the master piston 276 is stopped by a stop 328. Such rightward movement of the master piston 276 decreases fluid pressure in the main chamber 260 so as to urge the head end portion 282 of the slave piston 280 in the rearward direction (i.e. in the general direction of arrow 256 of FIGS. 8–10) thereby likewise moving the front idler wheel 232 in the rearward direction. The distance in which the idler wheel 232 is retracted (i.e. moved in the general direction of arrow 256 of FIGS. 8–10) corresponds to the stroke length of the master piston 276. As described above, hydraulic fluid lost during venting of the master chamber 272 is replaced in the accumulator by use of hydraulic fluid from the drive system 240.

As described above, the design of the track tensioning system 248 provides a recoil function to the undercarriage assembly 226 thereby eliminating the need for a separate recoil assembly such as a spring or the like. In particular, the combination of the check valve 334 and the pressure relief valve 336 allows for selective movement of the recoil piston 264 in the event that a rock or the like is ingested by the undercarriage assembly 226 during advancement of the excavator 210. Such movement of the recoil piston 264 causes corresponding movement of the front idler wheel 232. Hence, if during advancement of the excavator 210, a rock or the like is ingested by the undercarriage assembly 226 thereby urging the idler wheel 232 and hence the piston head end 282 of the slave piston rearwardly (i.e. in the general direction of arrow 256 of FIGS. 8–10), fluid pressure is exerted on a first end 338 of the recoil piston 264 thereby increasing fluid pressure in the recoil subchamber 262. Hydraulic fluid is prevented from flowing from the recoil subchamber 262 back to the accumulator 290 by the check valve 334 (see FIG. 9). However, if fluid pressure in the recoil subchamber 262 increases beyond the relief setting of the pressure relief valve 336 (e.g. 6,000 psi), the relief valve 336 opens thereby allowing fluid to be advanced from the recoil subchamber 262 to the accumulator 290. This causes rightward movement of the recoil piston 264 (as viewed in FIGS. 9 and 10) thereby allowing the slave piston 280 and hence the idler wheel 232 to be moved in a rearward direction (i.e. in the general direction of arrow 256 of FIGS. 9–10) thereby providing relief or slack in the drive track chain 238. It should be appreciated that such relief in the drive track chain 238 facilitates expulsion of the rock from the undercarriage assembly 226. Once the rock has been expelled from the undercarriage assembly 226, fluid pressure from the accumulator 290 is returned to the recoil subchamber 262 thereby again urging the recoil piston leftwardly (as viewed in FIGS. 9 and 10) against the stop 320 which returns the slave piston 280 and hence the idler wheel 232 to its previous position thereby returning the drive track chain 238 to its previous tension setting.

In regard to operation of the hydraulic excavator 210 equipped with the track tensioning assembly 350, actuation or deactuation of the hydraulic drive system 240 may be monitored in order to determine the mode of operation in which the excavator 210 is being operated in a similar manner as to that described above in regard to the track tensioning assembly 248. In particular, fluid pressure communicated from the hydraulic drive system 240 may be utilized to determine if the excavator 210 is being operated in a work mode of operation in which the excavator 210 is utilized to perform a work function such as a digging function, or a travel mode of operation in which the excavator 210 is advanced from one location to another. When the excavator 210 is being operated in its work mode of operation, the control valve 352 is positioned in its increase-tension position, as shown in FIG. 12. When the control valve 352 is positioned in its increase-tension position, pressurized hydraulic fluid is advanced from the pump 354 to the fluid chamber 374 of the slack adjuster device 356. Presence of fluid pressure within the fluid chamber 374, along with the bias of the springs 386, urges the pistons 382, 384 in opposite outward directions so as to position the pistons 382, 384 in their respective increase-tension positions at opposite end portions of the fluid chamber 374. Fluid pressure in the fluid chamber 374 also causes the check valves 388 to be positioned in their respective open check positions thereby allowing pressurized hydraulic fluid to advance to the hydraulic cylinders 364, 366 so as to cause extension of the rods 400 (i.e. movement of the rods 400 in the general direction of arrow 254 relative to the housings 398) thereby causing corresponding movement of the idler wheels 232 so as to increase tension on the drive track chains 238.

If an increase in fluid pressure is sensed in the fluid line 370 thereby indicating that the excavator 210 is being operated in its travel mode of operation, the control valve 352 is positioned in its decrease-tension position, as shown in FIG. 11. When the control valve 352 is positioned in its decrease-tension position, hydraulic fluid within the fluid chamber 374 of the slack adjuster device 356 is exhausted or otherwise vented to the reservoir 402 thereby causing retraction of the rods 400 (i.e. movement of the rods 400 in the general direction of arrow 256 relative to the housings 398) which causes corresponding movement of the idler wheels 232 so as to decrease tension on the drive track chains 238. The distance in which the idler wheels 232 are retracted (i.e. moved in the general direction of arrow 256 of FIGS. 7–8 and 11–12) corresponds to the stroke length of the pistons 382, 384 thereby achieving a desirable traveling track tension level.

The design of the track tensioning system 350 provides a recoil function to the undercarriage assembly 226 thereby eliminating the need for a separate recoil assembly such as a spring or the like. In particular, the combination of the accumulators 358, 360 and the pressure relief valve 362 allows for movement of the front idler wheels 232 in the event that a rock or the like is ingested by the undercarriage assembly 226 during advancement of the excavator 210. In particular, if during advancement of the excavator 210, a rock or the like is ingested by the undercarriage assembly 226 thereby urging the idler wheel 232 rearwardly (i.e. in the general direction of arrow 256 of FIGS. 7–8 and 11–12), hydraulic fluid is advanced out of the hydraulic cylinders 364, 366 and into the accumulators 358, 360, respectively. Hydraulic fluid is prevented from flowing through the slack adjuster device 356 and to the reservoir 402 by the check valves 388. Such advancement of hydraulic fluid out of the hydraulic cylinders 364, 366 and into the fluid accumulators 358, 360, respectively, causes the idler wheels 232 to be moved in the rearward direction (i.e. in the general direction of arrow 256 of FIGS. 7–8 and 11–12) thereby providing relief or slack in the drive track chain 238. It should be appreciated that such relief in the drive track chain 238 facilitates expulsion of the rock from the undercarriage assembly 226. Once the rock has been expelled from the undercarriage assembly 226, fluid pressure from the accumulators 358, 360 is returned to the hydraulic cylinders 364, 366, respectively, thereby again urging the idler wheels 232 in a forward direction (i.e. in the general direction of arrow 254 of FIGS. 7–8 and 11–12) to their previous position thereby returning the drive track chain 238 to its previous tension setting.

However, if fluid pressure in the fluid lines 394, 396 increases beyond the relief setting of the pressure relief valve 362 (e.g. 6,000 psi), the relief valve 362 opens thereby allowing fluid to be advanced to the reservoir 402. This provides additional relief to the components associated with the undercarriage assembly 226 thereby preventing damage thereto. Once pressure in the fluid lines 394, 396 decreases below the relief setting of the pressure relief valve (e.g. 6,000 psi), the relief valve closes thereby preventing additional fluid from being advanced to the reservoir 402. It should be appreciated that fluid lost during opening of the relief valve 362 may be replaced by the accumulators 358, 360. Moreover, the slack adjuster device 356 may be cycled in order to provide additional fluid, if necessary.

In regard to operation of the hydraulic excavator 210 equipped with the track tensioning assembly 450, the controller 470 monitors output from the mode sensor 462 in order to determine whether the excavator 210 is being operated in its work mode of operation in which the excavator 210 is utilized to perform a work function, or its travel mode of operation in which the excavator 210 is advanced from one location to another. If output from the mode sensor 462 indicates that the excavator 210 is being operated in its work mode of operation, the controller 470 causes substantially all of the slack to be removed from the drive track chain 238 by generating an output signal on the signal line 482 which actuates the solenoid 478 of the control valve assembly 456 thereby causing pressurized hydraulic fluid to be advanced to the hydraulic cylinders 364, 366 from the fluid source 458. The presence of pressurized hydraulic fluid at the head end of the hydraulic cylinders 364, 366 causes the rods 400 of the cylinders 364, 366 to be extended or otherwise moved in the forward direction (i.e. in the general direction of arrow 254 of FIGS. 7–8 and 15). Such forward movement of the rods 400 likewise urges the front idler wheels 232 in the forward direction (i.e. in the general direction of arrow 254 of FIGS. 7–8 and 15) thereby increasing tension on the drive track chain 238 until substantially all of the slack has been removed from the drive track chain 238.

Once substantially all of the slack has been removed from the drive track chain 238, the excavator 210 may be operated to perform a work function such as a digging operation. In particular, hydraulic pressure from the implement fluid supply circuit 464 is selectively directed to the components associated with the implement assembly of the excavator 210 such as the boom assembly 214 and the bucket 212 in order to perform the work function.

Thereafter, if the mode sensor 462 subsequently detects that the excavator 210 is being operated in its drive mode of operation, the controller 470 causes a predetermined amount of slack to be introduced into the drive track chain 238 by causing hydraulic fluid to be removed from the hydraulic cylinders 364, 366 in order to retract or otherwise move the rods 400 in a rearward direction (i.e. in the general direction of arrow 256 of FIGS. 7–8 and 15) by a predetermined distance. In particular, the controller 470 communicates with the control valve assembly 456 so as to cause pressurized hydraulic fluid to be drained from the hydraulic cylinders 364, 366 to the reservoir 460. The removal of pressurized hydraulic fluid from the head end of the hydraulic cylinders 364, 366 causes movement of the rods 400 of the cylinders 364, 366 in the rearward direction (i.e. in the general direction of arrow 256 of FIGS. 7–8 and 15). Such rearward movement of the rods 400 likewise urges the front idler wheels 232 in the rearward direction (i.e. in the general direction of arrow 256 of FIGS. 7–8 and 15) thereby decreasing tension on the drive track chain 238. Once the position sensors 454 detect that the front idler wheels 232 have been moved rearwardly by the predetermined distance, the controller 470 ceases to generate output signals on the signal line 482 thereby ceasing retraction of the rods 400 of the hydraulic cylinders 364, 366 so as to position the front idler wheels 232 in their respective traveling positions. It should be appreciated that retraction of the rods 400 of the hydraulic cylinders 364, 366 by the predetermined distance creates a corresponding predetermined amount of slack in the drive track chain 238. Once the front idler wheels 232 have been positioned in their respective traveling positions, the hydraulic components associated with the drive system 240 may be utilized to advance the excavator 210 in the desired direction. During such advancement of the excavator 210, the controller 470 monitors output from the position sensors 454 in order to maintain the front idler wheels 232 in their respective traveling positions in the manner previously discussed.

Moreover, during advancement of the excavator 210, the track tensioning assembly 450 provides a recoil function to the undercarriage assembly 226. In particular, if a rock or the like is ingested by the undercarriage assembly 226 during advancement of the excavator 210, one of the front idler wheels 232 is urged or otherwise moved rearwardly (i.e. in the general direction of arrow 256 of FIGS. 7–8 and 15) thereby increasing fluid pressure in the supply lines from the control valve assembly 456 to the hydraulic cylinders 364, 366. Once fluid pressure within the supply lines is greater in magnitude (e.g. 6,000 psi) than the relief setting of the pressure relief valve (not shown) which is interposed between the control valve assembly 456 and the hydraulic cylinders 364, 366, hydraulic fluid within the supply lines and the affected hydraulic cylinder 364, 366 is exhausted to the reservoir 460 via the pressure relief valve thereby allowing the rod 400 (and hence the corresponding front idler wheel 232) to be urged or otherwise moved in the rearward direction (i.e. in the general direction of arrow 256 of FIGS. 7–8 and 15) thereby providing relief or slack in the drive track chain 238. It should be appreciated that such relief in the drive track chain 238 facilitates expulsion of the rock from the undercarriage assembly 16. Once the rock has been expelled from the undercarriage assembly 226, the front idler wheel 232 is returned to its previous traveling position thereby returning the drive track chain 238 to its previous tension level. In particular, the controller 470 controls actuation of the control valve assembly 456 based on output from the position sensors 454 in order to return the affected front idler wheel 232 to its previous traveling position thereby returning the drive track chain 238 to its previous tension level.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

There are a plurality of advantages of the present invention arising from the various features of the work machines described herein. It will be noted that alternative embodiments of the work machines of the present invention may not include all of the features described yet still benefit from at least some of the advantages of such features. Those of ordinary skill in the art may readily devise their own implementations of the work machines that incorporate one or more of the features of the present invention and fall within the spirit and scope of the present invention as defined by the appended claims.

What is claimed is:

1. A method of operating a work machine having (i) a drive motor for driving a drive track chain, (ii) a track tensioning assembly for adjusting tension on said drive track chain, and (iii) a work implement for performing a work function, comprising the steps of:
    idling said drive motor so as to cease advancement of said work machine during a first period of time;
    operating said work implement so as to perform said work function during said first period of time;
    operating said track tensioning assembly so as to increase tension on said drive track chain during said first period of time;
    actuating said drive motor so as to advance said work machine during a second period of time; and
    operating said track tensioning assembly so as to decrease tension on said drive track chain during said second period of time.

2. The method of claim 1, wherein:
    said work implement includes a hydraulic bucket for performing a digging operation, and
    said work implement operating step includes the step of operating said hydraulic bucket so as to perform said digging operation during said first period of time.

3. The method of claim 1, wherein said work machine further has an implement control device for allowing an operator of said work machine to control operation of said work implement, further comprising the step of:
    determining if said operator of said work machine operates said implement control device and generating an implement-active control signal in response thereto.

4. The method of claim 3, wherein said step of operating said track tensioning assembly so as to increase tension on said drive track chain is performed in response to generation of said implement-active control signal.

5. The method of claim 3, wherein:
    said work machine further has (i) an implement supply circuit for supplying pressurized hydraulic fluid to said work implement, and (ii) a pressure sensor which generates output signals indicative of fluid pressure within said implement supply circuit, and
    said determining step includes the step of sensing fluid pressure within said implement fluid supply circuit with said pressure sensor and generating said implement-active control signal if said fluid pressure is above a predetermined pressure threshold.

6. The method of claim 3, wherein:
    said implement control device has a position sensor associated therewith for sensing actuation of said implement control device by said operator of said work machine, and
    said determining step includes the step of detecting actuation of said implement control device with said position sensor and generating said implement-active control signal in response thereto.

7. The method of claim 1, wherein said work machine further has an drive control device for allowing an operator of said work machine to control advancement of said work machine, further comprising the step of:
    determining if said operator of said work machine operates said drive control device so as to advance said work machine and generating a machine-advancement control signal in response thereto.

8. The method of claim 7, wherein both said drive motor actuating step and said step of operating said track tensioning assembly so as to decrease tension on said drive track chain are performed in response to generation of said machine-advancement control signal.

9. The method of claim 7, wherein:
    said work machine further has (i) a drive supply circuit for supplying pressurized hydraulic fluid to said drive motor of said work machine, and (ii) a pressure sensor which generates output signals indicative of fluid pressure within said drive supply circuit, and
    said determining step includes the step of sensing fluid pressure within said drive supply circuit and generating said machine-advancement control signal if said fluid pressure is above a predetermined pressure threshold.

10. The method of claim 7, wherein:
    said drive control device has a position sensor associated therewith for sensing actuation of said drive control device by said operator of said work machine, and
    said determining step includes the step of detecting actuation of said drive control device with said position sensor and generating said machine-advancement control signal in response thereto.

11. A work machine, comprising:

a drive track chain;

an idler wheel for providing tension to said drive track chain;

an actuator mechanically coupled to said idler wheel so as to selectively move said idler wheel between a number of wheel positions;

a first sensor for sensing position of said idler wheel;

a second sensor for determining if said work machine is being operated in a drive mode of operation or a work mode of operation;

a processing unit electrically coupled to both said first sensor and said second sensor; and a memory device electrically coupled to said processing unit, wherein said memory device has stored therein a plurality of instructions which, when executed by said processing unit, causes said processing unit to:

(i) monitor output from said second sensor so as to determine if said work machine is being operated in said work mode of operation, (ii) generate an increase-tension control signal if said work machine is being operated in said work mode of operation, (iii) actuate said actuator in response to generation of said increase-tension control signal so as to advance said idler wheel in a first direction which causes tension on said drive track chain to be increased, and (iv) monitor output from said first sensor so as to determine position of said idler wheel during advancement of said idler wheel in said first direction.

12. The work machine of claim 11, wherein said plurality of instructions, when executed by said processing unit, further causes said processing unit to:

(i) generate a track-taut control signal when said idler wheel has been advanced to a first predetermined wheel position, and (ii) deactuate said actuator so as to cease advancement of said idler wheel in said first direction in response to generation of said track-taut control signal.

13. The work machine of claim 11, wherein said plurality of instructions, when executed by said processing unit, further causes said processing unit to:

(i) generate a decrease-tension control signal if said work machine is being operated in said drive mode of operation, (iii) actuate said actuator in response to generation of said decrease-tension control signal so as to advance said idler wheel in a second direction which causes tension on said drive track chain to be decreased, and (iv) monitor output from said first sensor so as to determine position of said idler wheel during advancement of said idler wheel in said second direction.

14. The work machine of claim 13, wherein said plurality of instructions, when executed by said processing unit, further causes said processing unit to:

(i) generate a tension-reduced control signal when said idler wheel has been advanced to a second predetermined wheel position, and (ii) deactuate said actuator so as to cease advancement of said idler wheel in said second direction in response to generation of said tension-reduced control signal.

15. A hydraulic excavator, comprising:

a hydraulic implement assembly having a boom assembly with a bucket secured thereto;

a drive track chain;

a track tensioning assembly for tensioning said drive track chain;

a sensor configured to detect operation of said implement assembly by an operator of said excavator; and a controller electrically coupled to said sensor, wherein said controller is configured to operate said track tensioning assembly so as to increase tension of said drive track chain when said sensor detects operation of said implement assembly by said operator of said work machine.

16. The hydraulic excavator of claim 15, further comprising a drive motor operatively coupled to said drive track chain so as to advance said drive track chain, wherein:

said sensor is further configured to detect operation of said drive motor by said operator of said excavator; and said controller is further configured to operate said track tensioning assembly so as to decrease tension of said drive track chain when said sensor detects operation of said drive motor by said operator of said work machine.

* * * * *